(12) United States Patent
Kreiger et al.

(10) Patent No.: US 10,992,120 B2
(45) Date of Patent: Apr. 27, 2021

(54) SIDEWALL CLOSEOUT AREA ASSEMBLY, SYSTEM, AND METHOD FOR ROUTING CONDUCTIVE ELEMENTS IN AN AIRCRAFT

(71) Applicant: The Boeing Company, Chicago, IL (US)

(72) Inventors: Colin R. Kreiger, Lake Stevens, WA (US); Gregory A. Tubbs, Marysville, WA (US); Alexander J. Matsuoka, Kirkland, WA (US); Michael E. Frick, Shoreline, WA (US); Ryan P. Rogers, Woodinville, WA (US); Jackson L. Fadely, Westminster, CA (US); Derrick B. Pruitt, Bothell, WA (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 16/459,499

(22) Filed: Jul. 1, 2019

(65) Prior Publication Data
US 2021/0006050 A1    Jan. 7, 2021

(51) Int. Cl.
*H02G 3/04* (2006.01)
*B64D 11/06* (2006.01)

(52) U.S. Cl.
CPC ....... *H02G 3/0406* (2013.01); *B64D 11/0624* (2014.12)

(58) Field of Classification Search
CPC ........ H02G 3/0406; H02G 3/04; H02G 3/263; H02G 3/0456; H02G 1/06; H02G 3/0437; H02G 3/0431; H02G 3/34; H01R 4/60; H01B 7/00; B62D 25/20; B64C 3/18; B60R 16/02; B64D 45/00; B64D 47/00; B64D 2221/00; B64D 11/0624
USPC ......................................................... 174/135
See application file for complete search history.

(56) References Cited

U.S. PATENT DOCUMENTS

| | | |
|---|---|---|
| RE32,554 E | 12/1987 | Murphy |
| 5,137,231 A | 8/1992 | Boss |
| 6,129,312 A | 10/2000 | Weber |
| 6,273,365 B1 * | 8/2001 | Hiesener .............. B64D 11/003 244/118.1 |
| 6,402,536 B2 * | 6/2002 | Tsukamoto ......... B60R 16/0215 439/211 |
| 6,546,673 B2 | 4/2003 | Aquino |

(Continued)

*Primary Examiner* — Timothy J Thompson
*Assistant Examiner* — Michael F McAllister

(57) ABSTRACT

There is provided a sidewall closeout area assembly for an aircraft. The assembly includes a raceway with a first end to attach to a sidewall assembly, a second end to attach to aircraft floor structure(s), and a raceway body with first access opening(s) providing access to one or more of, a crown area and an underfloor area, for conductive elements routed along the raceway. The assembly further includes a raceway cover removably coupled to the raceway and having second access opening(s) providing access to the cabin and to an overfloor area in the cabin for the conductive elements. The assembly further includes a closeout area formed between the raceway body and the raceway cover, to house and protect the conductive elements. The assembly facilitates accessibility to the conductive elements, and provides a routing path for the conductive elements that does not need to be reconfigured for different aircraft cabin layouts.

20 Claims, 17 Drawing Sheets

(56) References Cited

U.S. PATENT DOCUMENTS

| | | | |
|---|---|---|---|
| 6,727,434 B2* | 4/2004 | Jadaud | H02G 3/0608 174/135 |
| 7,049,508 B2* | 5/2006 | Bushey | H02G 3/0425 174/481 |
| 8,167,231 B2* | 5/2012 | Leisten | B64C 1/18 244/1 A |
| 9,040,821 B2* | 5/2015 | Blanchard | H02G 3/0431 174/72 A |
| 9,221,542 B2* | 12/2015 | Imbert | B64D 11/0696 |
| 9,499,251 B2 | 11/2016 | Perkins et al. | |
| 9,590,403 B2* | 3/2017 | Jackson, Jr. | H02G 3/0406 |
| 9,751,609 B2 | 9/2017 | Perkins et al. | |
| 9,796,245 B2 | 10/2017 | Switzer et al. | |
| 2006/0237585 A1* | 10/2006 | Lau | B64D 11/003 244/118.5 |
| 2007/0095561 A1* | 5/2007 | Lubanski | H02G 9/02 174/135 |
| 2009/0152399 A1* | 6/2009 | Laue | B64C 1/1446 244/132 |
| 2014/0327271 A1* | 11/2014 | Kishima | B60R 16/0215 296/193.07 |
| 2016/0373053 A1* | 12/2016 | Grushkowitz | H02S 40/36 |
| 2017/0129581 A1 | 5/2017 | Perkins et al. | |
| 2017/0349261 A1 | 12/2017 | Brown et al. | |
| 2017/0349262 A1 | 12/2017 | Brown et al. | |

* cited by examiner

SIDEWALL CLOSEOUT AREA ASSEMBLY 10

| INTEGRATED STRUCTURE 31 | MODULAR DESIGN 146 | VARIABILITY ELIMINATION 154 |
| FLOOR PEN. ELIM. 150 | FUNCT. ELECTRICAL CONDUIT 156 | NONCONDUCTIVE MATERIAL(S) 140 |

RACEWAY 18

| FIRST END 20 | SECOND END 22 | ATTACH. ELEM(S). 30 | BRACKET(S) 30a | CLIP(S) 30b | BOLT(S) 30c |
| RACEWAY BODY (RB) 24 | ELONGATED RB 24a | FIRST SIDE 34 | SECOND SIDE 36 |
| FIRST ACCESS OPENINGS 40 | LENGTH 44 | RB SECTIONS 54 | ADJ. RB SECTIONS 54a |
| LONG. FORE-AFT DIRECTION 56 | END PORTIONS 58 | FLANGE PORTION 42 | UNDERSIDE 102 |

| CLOSEOUT AREA 142 | CROSS-SECTIONAL AREA 144 | UNUSED VOLUME 148 |

RACEWAY COVER (RC) 90

| SNAP-IN RC 92 | SNAP-FIT DES. 94 | BOTTOM END 96 | TAB MEMBERS 98 | TOP END 100 |
| FASTENED RC 106 | FASTENER ELEM(S). 104 | FIRST COVER SIDE 108 | SECOND COVER SIDE 110 |
| SECOND ACCESS OPENINGS 114 | UNITARY STRUCTURE 118 | RC SECTIONS 120 |
| ADJACENT RC SECTIONS 120a | END PORTIONS 122 |

BREAKOUT COVER (BC) 124

| BC OPENING(S) 126 | SNAP-IN BC 128 | BC SNAP-FIT DESIGN 130 | BOTTOM END 132 |
| TAB MEMBERS 134 | TOP END 136 | FASTENED BC 138 | INTERMIT. ROUTING BREAKOUTS 139 |

PLURALITY OF CONDUCTIVE ELEMENTS 50

| WIRES 60 | PCBS 64 | TUBES 66 | CAPACITORS 68 |

| CABLES 62 | ELECTRICAL CABLES 62a | DATA BUS CABLES 62b |
| HIGH SPEED TRANSMISSION CABLES 62c | COAXIAL CABLES 62d | FIBER OPTIC CABLES 62e |

| PLURALITY OF ELECTRICAL RUNS 70 | POWER RUNS 72 | DATA RUNS 74 | LIGHTING SYS. RUNS 76 |
| SEAT SYS. RUNS 78 | IFE SYS. RUNS 80 | SEAT ACTUATION RUNS 82 | PED RUNS 84 |

| SYSTEMS TRANSPORT ELEMENT(S) 85 | PNEUMATIC LINES 85a |
| AIR LINES 85b | FLUID LINES 85c | WATER LINES 85d |

| ROUTING PATH 86 | DIFFERENT AC CABIN LAYOUTS 87 | SYSTEMS ROUTING 88 |

FIG. 1A

SIDEWALL CLOSEOUT AREA ASSEMBLY, SYSTEM, AND METHOD FOR ROUTING CONDUCTIVE ELEMENTS IN AN AIRCRAFT

CROSS REFERENCE TO RELATED APPLICATION

This non-provisional patent application is related to contemporaneously filed U.S. non-provisional patent application Ser. No. 16/459,531, titled ASSEMBLY, SYSTEM, AND METHODS FOR INSTALLING CONDUCTIVE ELEMENTS IN AN AIRCRAFT, filed on Jul. 1, 2019, the contents of which are hereby incorporated by reference in its entirety.

FIELD

The disclosure relates generally to sidewall panel assemblies, systems, and methods for aircraft, and more particularly, to sidewall panel assemblies, systems, and methods having and using a sidewall closeout area for routing conductive elements in aircraft passenger cabins.

BACKGROUND

Aircraft, such as commercial aircraft, have sidewall panels located in an interior of an aircraft passenger cabin. Such sidewall panels are designed to cover an aircraft frame and walls, as well as to cover aircraft insulation, ducting, and conductive elements, such as electrical runs, for example, wiring and cables, and systems transport elements, for example, air lines and water lines, which are located along the length of the aircraft passenger cabin.

In addition, electrical runs including power, data, in-flight entertainment (IFE), lighting, and other seat systems, are typically routed from behind sidewall panels or from under the floor to the seats in the aircraft passenger cabin. Such electrical runs may be installed in conduits that are attached by adhesive, or other attachment means, to the aircraft floor. These conduits are typically covered with floor coverings, such as carpet or mats, which may cause bumps and discontinuities in the floor coverings. Moreover, such floor coverings may require additional seams for breakout locations for the electrical runs. Further, secondary shielding layers may need to be installed around the electrical runs to avoid damage from potential contact sources, such as passengers or carry-on freight. However, such secondary shielding layers may be heavy and add unwanted weight to the aircraft. Also, with reconfigurable palletized seats, which have large metallic structures that are bolted to the floor of the aircraft passenger cabin, when such palletized seats are reconfigured, complex conduit or raceway layouts must be designed to avoid the large metallic structures.

Electrical runs may also be routed through the crown and through the floor of the aircraft passenger cabin to connect to main electrical runs in the crown and underfloor areas. However, electrical runs routed through the floor typically require that floor penetrations be made through the floor area under the seats in the aircraft passenger cabin. Such routing of the electrical runs through the floor may cause variation in floor panels, may cause holes in the floor, and may cause floor covering protrusions. Moreover, when the seats are reconfigured or installed in the aircraft passenger cabin, such electrical runs routed in the underfloor area and in the crown area may be difficult to access or to modify without interference through existing aircraft structures.

Known electrical run routing assemblies and systems exist that provide a flat floor by using channels. However, such known electrical run routing assemblies and systems may still result in floor panel variability and penetrations through the floor, and such channels may become an obstacle during production operations, when parts and tools need to be transported within the aircraft passenger cabin.

Further, known electrical run routing systems and methods in the aircraft passenger cabin may result in numerous variable configurations and layouts that may be difficult to manage and difficult to install. Moreover, the extensive time and effort for installation using such known electrical run routing systems and methods may present ergonomic issues for installers.

Accordingly, there is a need in the art for an assembly, system, and method for routing conductive elements in aircraft passenger cabins that eliminate variability in design and installation, that allow for accessibility and easy installation and routing without interference through aircraft structures, that allow for rapid reconfiguration of seats in the aircraft passenger cabin, that have aesthetic benefits, that eliminate possible damage to the electrical runs, that reduce cost and weight, and that provide advantages over known assemblies, systems, and methods.

SUMMARY

Example implementations of the present disclosure provide a sidewall closeout area assembly, system, and method for routing conductive elements in aircraft passenger cabins. As discussed in the below detailed description, versions of the sidewall closeout area assembly, system, and method may provide significant advantages over known assemblies, systems, and methods.

In a version of the disclosure, there is provided a sidewall closeout area assembly for an aircraft. The sidewall closeout area assembly comprises a raceway having a first end, a second end, and a raceway body formed between the first end and the second end.

The first end of the raceway is configured to attach to a bottom portion of a sidewall assembly configured for installation in a cabin of the aircraft. The second end of the raceway is configured to attach to one or more aircraft floor structures. The raceway body has a first side configured to face an interior frame of the aircraft. The raceway body comprises one or more first access openings providing access to one or more of, a crown area and an underfloor area, in the aircraft, for a plurality of conductive elements routed along the raceway.

The sidewall closeout area assembly further comprises a raceway cover removably coupled to the raceway. The raceway cover has a first cover side facing a second side of the raceway body, and has a second cover side configured to face an interior of the cabin. The raceway cover comprises one or more second access openings providing access to the cabin and access to an overfloor area in the cabin for the plurality of conductive elements routed along the raceway.

The sidewall closeout area assembly further comprises a closeout area formed between the raceway body and the raceway cover. The closeout area is configured to house and protect the plurality of conductive elements routed along the raceway.

The sidewall closeout area assembly facilitates accessibility to the plurality of conductive elements, and provides a routing path for the plurality of conductive elements that does not need to be reconfigured for different aircraft cabin layouts.

In another version of the disclosure, there is provided a sidewall closeout area system for an aircraft. The sidewall closeout area system comprises a sidewall assembly disposed in a cabin of the aircraft. The sidewall closeout area system further comprises a sidewall closeout area assembly attached to the sidewall assembly.

The sidewall closeout area assembly comprises a raceway having a first end attached to a bottom portion of the sidewall assembly, a second end attached to one or more aircraft floor structures, and a raceway body formed between the first end and the second end. The raceway body has a first side facing an interior frame of the aircraft, and the raceway body comprises one or more first access openings providing access to one or more of, a crown area and an underfloor area, in the aircraft, for a plurality of conductive elements routed along the raceway.

The sidewall closeout area assembly further comprises a raceway cover removably coupled to the raceway. The raceway cover has a first cover side facing a second side of the raceway body, and has a second cover side facing an interior of the cabin. The raceway cover comprises one or more second access openings providing access to the cabin and access to an overfloor area in the cabin for the plurality of conductive elements routed along the raceway.

The sidewall closeout area assembly further comprises a closeout area formed between the raceway body and the raceway cover. The closeout area houses and protects the plurality of conductive elements routed along the raceway.

The sidewall closeout area system facilitates accessibility to the plurality of conductive elements, and provides a routing path for the plurality of conductive elements that does not need to be reconfigured for different aircraft cabin layouts.

In another version of the disclosure, there is provided a method of routing a plurality of conductive elements through a sidewall closeout area assembly in an aircraft. The method comprises the step of providing the sidewall closeout area assembly attached to a sidewall assembly disposed in a cabin of the aircraft.

The sidewall closeout area assembly comprises a raceway having a first end attached to a bottom portion of the sidewall assembly, a second end attached to one or more aircraft floor structures, and a raceway body formed between the first end and the second end. The raceway body has a first side facing an interior frame of the aircraft. The raceway body comprises one or more first access openings.

The sidewall closeout area assembly further comprises a raceway cover removably coupled to the raceway. The raceway cover has a first cover side configured to face a second side of the raceway body, and has a second cover side configured to face an interior of the cabin. The raceway cover comprises one or more second access openings. The sidewall closeout area assembly further comprises a closeout area formed between the raceway body and the raceway cover.

The method further comprises the step of routing the plurality of conductive elements along the raceway of the sidewall closeout area assembly. The method further comprises the step of routing one or more of the plurality of conductive elements through the one or more first access openings in the raceway, to access one or more of, a crown area above the cabin, and an underfloor area below the cabin.

The method further comprises the step of attaching the raceway cover to the raceway, to house and protect the plurality of conductive elements in the closeout area of the sidewall closeout area assembly. The method further comprises the step of routing one or more of the plurality of conductive elements through the one or more second access openings in the raceway cover, to access the cabin and to access an overfloor area in the cabin.

The sidewall closeout area assembly facilitates accessibility to the plurality of conductive elements, and provides a routing path for the plurality of conductive elements that does not need to be reconfigured for different aircraft cabin layouts.

The features, functions, and advantages that have been discussed can be achieved independently in various versions of the disclosure or may be combined in yet other versions further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein:

FIG. 1A is an illustration of a functional block diagram showing an exemplary version of a sidewall closeout area assembly of the disclosure;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1B:
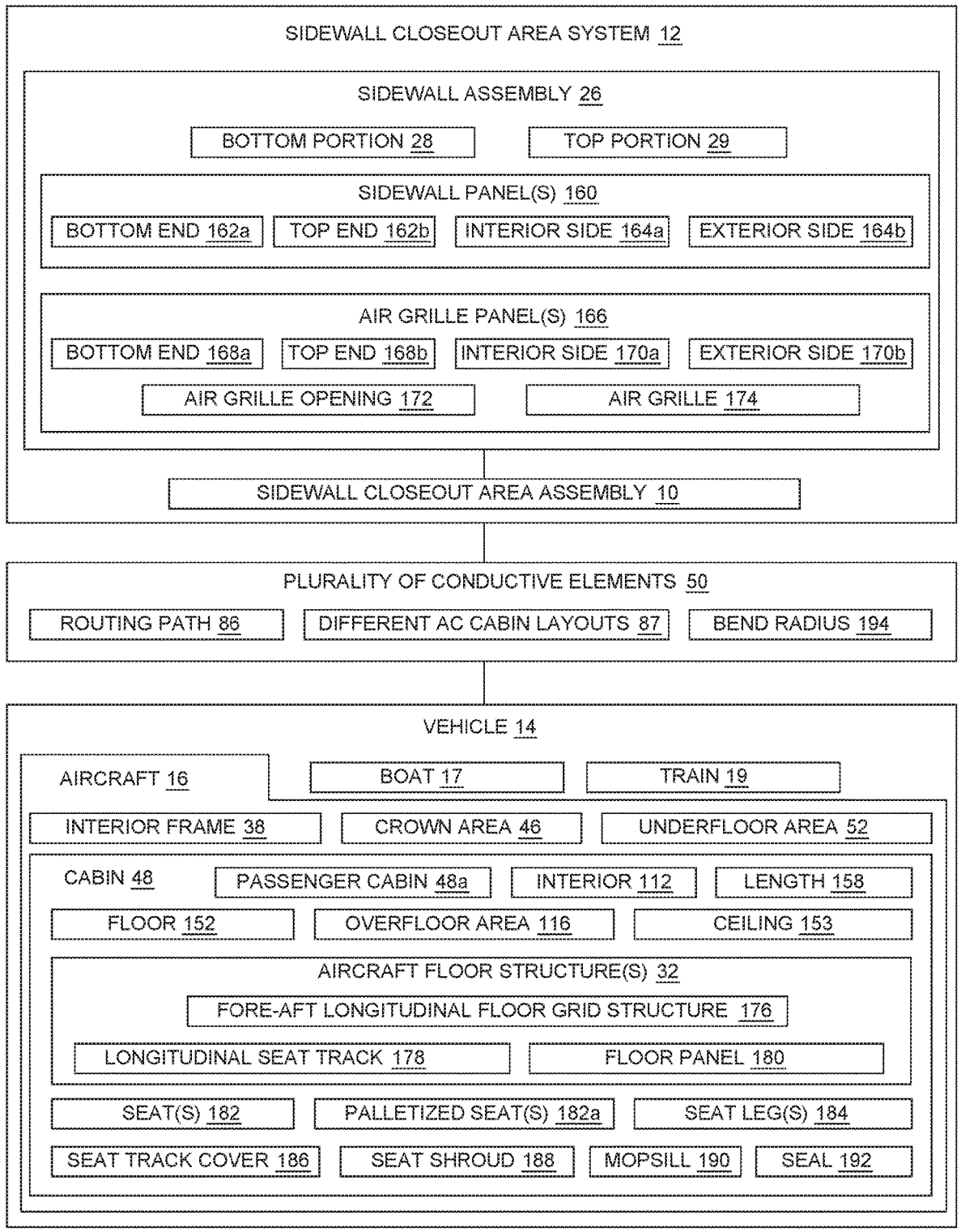
FIG. 1B is an illustration of a functional block diagram showing an exemplary version of a sidewall closeout area system of the disclosure, incorporating an exemplary version of a sidewall closeout area assembly of the disclosure.

Now referring to the Figures, FIG. 1A is an illustration of a functional block diagram showing an exemplary version of a sidewall closeout area assembly 10 of the disclosure, and FIG. 1B is an illustration of a functional block diagram showing an exemplary version of a sidewall closeout area system 12 of the disclosure incorporating an exemplary version of the sidewall closeout area assembly 10, for use in a vehicle 14, such as an aircraft 16, or other suitable vehicle.

As shown in FIG. 1A, the sidewall closeout area assembly 10 for the vehicle 14, such as the aircraft 16, comprises a raceway 18 having a first end 20, a second end 22, and a raceway body 24, such as an elongated raceway body 24a, formed between the first end 20 and the second end 22. The first end 20 of the raceway 18 is configured to attach, and attaches, to a sidewall assembly 26 (see FIG. 1B), for example, a bottom portion 28 (see FIG. 1B) of the sidewall assembly 26. In one version, the first end 20 of the raceway 18 may be attached to the sidewall assembly 26 with a plurality of attachment elements 30 (see FIG. 1A), for example, brackets 30a (see FIG. 1A), clips 30b (see FIG. 1A), bolts 30c (see FIG. 1A), or other suitable attachment elements. Alternatively, the first end 20 of the raceway 18 may be attached or bonded to the sidewall assembly 26 with adhesive, or with another suitable means of attachment.

In another version, the first end 20 of the raceway 18 may be integrated with, or formed with, the sidewall assembly 26, such as the bottom portion 28 of the sidewall assembly 26, so that the sidewall closeout area assembly 10 is an integrated structure 31 (see FIG. 1B). The sidewall assembly 26 is discussed in further detail below.

The second end 22 of the raceway 18 is configured to attach, and attaches, to one or more aircraft floor structures 32 (see FIG. 1B), discussed in further detail below. The second end 22 of the raceway 18 may be attached to the one or more aircraft floor structures 32 with a plurality of attachment elements 30 (see FIG. 1A), for example, brackets 30a (see FIG. 1A), clips 30b (see FIG. 1A), bolts 30c (see FIG. 1A), or other suitable attachment elements, or may be attached with tape or bonded with adhesive, or may be attached with another suitable means of attachment.

As shown in FIG. 1A, the raceway body 24 has a first side 34 and a second side 36. The first side 34 is configured to face, and faces an interior frame 38 (see FIG. 1B) of the aircraft 16, when the raceway 18 is installed in the aircraft 16 (see FIG. 1B). The raceway body 24 comprises one or more first access openings 40 formed through the raceway body 24. The raceway body 24 may comprise a flange portion 42 (see FIGS. 1A, 4) extending inboard, or inwardly from the second side 36, of the raceway body 24 and extending along a length 44 (see FIG. 1A) of the raceway 18.

The one or more first access openings 40 may provide access to a crown area 46 (see FIG. 1B) located above a cabin 48 (see FIG. 1B), such as a passenger cabin 48a (see FIG. 1B), in the aircraft 16, for a plurality of conductive elements 50 routed along the raceway 18. The routing of the plurality of conductive elements 50 in the sidewall closeout area assembly 10 is meant to also allow for not having to route to the crown area 46, but may be optionally routed to the crown area 46, if desired. The one or more first access openings 40 may further provide access to an underfloor area 52 (see FIG. 1B) located below the cabin 48, such as the passenger cabin 48, in the aircraft 16, for the plurality of conductive elements 50 routed along the raceway 18.

The raceway body 24 of the sidewall closeout area assembly 10 may comprise two or more raceway body sections 54 (see FIGS. 1A, 7) aligned adjacent to each other, or configured to be aligned adjacent to each other, in a longitudinal fore-aft direction 56 (see FIG. 1A). When the raceway body 24 of the raceway 18 comprises two or more raceway body sections 54, the one or more first access openings 40 are preferably formed between end portions 58 (see FIGS. 1A, 7) of adjacent raceway body sections 54a (see FIG. 1A).

As shown in FIG. 1A, the plurality of conductive elements 50 comprise one or more of, wires 60, cables 62 including electrical cables 62a, data bus cables 62b, high speed transmission cables 62c, coaxial cables 62d, fiber optic cables 62e, or other suitable cables, printed circuit boards (PCBs) 64, tubes 66, capacitors 68, and other suitable conductive elements.

As shown in FIG. 1A, the plurality of conductive elements 50 further comprise a plurality of electrical runs 70 comprising one or more of, power runs 72, data runs 74, lighting system runs 76, and seat system runs 78, including in-flight entertainment (IFE) system runs 80, seat actuation runs 82, and personal electronic device (PED) runs 84, and other suitable electrical runs.

As shown in FIG. 1A, the one or more conductive elements 50 further comprise one or more systems transport elements 85 comprising one or more of, pneumatic lines 85a, air lines 85b, fluid lines 85c, water lines 85d, or other suitable systems transport elements 85. For example, the pneumatic lines 85a or air lines 85b may be used for lumbar support in seats 182 (see FIG. 1B) in the cabin 48, or for passenger air vents, and the fluid lines 85c or water lines 85d may be used for a potable water supply, or vending drink service to seats 182, such as in first class.

The sidewall closeout area assembly 10 facilitates accessibility to the plurality of conductive elements 50. In addition, the sidewall closeout area assembly 10 provides a routing path 86 (see FIG. 1A) for the plurality of conductive elements 50 that does not need to be reconfigured for different aircraft cabin layouts 87 (see FIG. 1A). The sidewall closeout area assembly 10 provides a systems routing 88 (see FIG. 1A) for the plurality of conductive elements 50, for example, the plurality of electrical runs 70, through the cabin 48 of the aircraft 16.

As shown in FIG. 1A, the sidewall closeout area assembly 10 further comprises a raceway cover 90 removably coupled, or attached, to the raceway 18. In one version, the raceway cover 90 comprises a snap-in raceway cover 92 (see FIGS. 1A, 8). The raceway cover 90, such as in the form of the snap-in raceway cover 92, has a snap-fit design 94 (see FIG. 1A). The raceway cover 90, such as in the form of the snap-in raceway cover 92, has a bottom end 96 (see FIGS. 1A, 8) with tab members 98 (see FIGS. 1A, 8) that are configured to couple to an aircraft floor structure 32, and has a top end 100 (see FIGS. 1A, 8) that is configured to slide under and against an underside 102 (see FIGS. 1A, 8) of the flange portion 42 (see FIGS. 1A, 8) of the raceway 18.

The raceway cover 90, such as in the form of the snap-in raceway cover 92, is easily coupled to the aircraft floor structure 32 and to the raceway 18, and is easily removable from the aircraft floor structure 32 and from the raceway 18. The raceway cover 90, such as in the form of the snap-in raceway cover 92, does not require any additional fastener elements 104 (see FIG. 1A) to couple, or attach, the raceway cover 90 to the raceway 18.

In another version, the raceway cover 90 may comprise a fastened raceway cover 106 that may be fastened to the raceway 18 and/or to the aircraft floor structure 32 with one or more fastener elements 104 (see FIG. 1A), such as bolts, screws, clips, or other suitable fastener elements, or may be attached with tape or bonded with adhesive, or may be attached with another suitable means of attachment.

The raceway cover 90 has a first cover side 108 (see FIG. 1A) configured to face, and facing, the second side 36 of the raceway body 24, when the raceway cover 90 is coupled, or attached, to the raceway 18. The raceway cover 90 has a second cover side 110 configured to face, and facing, an interior 112 of the cabin 48, when the raceway cover 90 is coupled or attached to the raceway 18. The raceway cover 90 further comprises one or more second access openings 114 (see FIG. 1A) providing access to the cabin 48 of the aircraft 16, and providing access to an overfloor area 116 in the cabin 48, for the plurality of conductive elements 50 routed along the raceway 18.

In one version, the raceway cover 90 comprises a unitary structure 118 (see FIG. 1A) with one or more second access openings 114 formed through the raceway cover 90.

In another version, the raceway cover 90 comprises two or more raceway cover sections 120 (see FIGS. 1A, 10A) aligned adjacent to each other, or configured to be aligned adjacent to each other, in the longitudinal fore-aft direction 56 (see FIG. 1A). The one or more second access openings 114 are formed between end portions 122 (see FIGS. 1A, 10A) of adjacent raceway cover sections 120a (see FIG. 1A).

In yet another version, the raceway cover 90 may comprise two or more raceway cover sections 120 (see FIGS. 1A, 10B), and the sidewall closeout area assembly 10 further comprises one or more breakout covers 124 (see FIGS. 1A, 10B) positioned between the two or more raceway cover sections 120 and removably coupled, or attached, to the raceway 18. The one or more second access openings 114 comprise one or more breakout cover openings 126 (see FIGS. 1A, 10B) formed in and through the one or more breakout covers 124. In this version the second access openings 114 are formed through the breakout covers 124 aligned in-between the raceway cover sections 120, and are in the form of the breakout cover openings 126 for routing the plurality of conductive elements 50 out of the sidewall closeout area assembly 10 and into the interior 112 of the cabin 48 and the overfloor area 116 in the cabin 48.

In one version, the breakout cover 124 comprises a snap-in breakout cover 128 (see FIG. 1A). The breakout cover 124, such as in the form of the snap-in breakout cover 128, has a breakout cover snap-fit design 130 (see FIG. 1A). The breakout cover 124, such as in the form of the snap-in breakout cover 128, has a bottom end 132 (see FIG. 1A) with tab members 134 (see FIG. 1A) that are configured to couple to an aircraft floor structure 32, and has a top end 136 (see FIG. 1A) that is configured to slide under and against an underside 102 (see FIG. 1A) of the flange portion 42 (see FIG. 1A) of the raceway 18.

The breakout cover 124, such as in the form of the snap-in breakout cover 128, is easily coupled to the aircraft floor structure 32 and to the raceway 18, and is easily removable from the aircraft floor structure 32 and from the raceway 18, and does not require any additional fastener elements 104 (see FIG. 1A) to couple or attach the breakout cover 124 to the raceway 18.

In another version, the breakout cover 124 may comprise a fastened breakout cover 138 that may be fastened to the raceway 18 and/or to the aircraft floor structure 32 with one or more fastener elements 104 (see FIG. 1A), such as bolts, screws, clips, or other suitable fastener elements.

The one or more first access openings 40 (see FIGS. 1A, 7) formed through the raceway body 24 (see FIG. 1A) or raceway body sections 54, and the one or more second access openings 114 (see FIGS. 1A, 10A), including the one or more breakout cover openings 126 (see FIGS. 1A, 10B), formed through the raceway cover 90 (see FIG. 1A), the raceway cover sections 120 (see FIG. 1A), or the breakout covers 124 (see FIG. 1A), provide intermittent routing breakouts 139 (see FIG. 1A) for the plurality of conductive elements 50 housed in and along the sidewall closeout area assembly 10.

The raceway 18, the raceway cover 90, and the breakout cover 124 are preferably made of one or more nonconductive materials 140 (see FIG. 1A). Some exemplary nonconductive materials 140 that may be used include composite materials, such as high performance thermoplastics, fiber reinforced plastics, and other types of plastic materials, for example, polyetherketoneketone (PEKK), polyetheretherketone (PEEK), polyvinyl fluoride (PVF), or another suitable plastic material. The raceway 18 may also be made of a metal material or another suitable material.

As shown in FIG. 1A, the sidewall closeout area assembly 10 further comprises a closeout area 142, or space, formed between the raceway body 24 of the raceway 18, and the raceway cover 90. The closeout area 142 is configured to house and protect, and houses and protects, the plurality of conductive elements 50 routed along the raceway 18. In addition, the raceway cover 90 prevents moisture and debris from falling inside or entering the closeout area 142. A cross-sectional area 144 (see FIG. 1A) of the closeout area 142 is sufficiently large to house the plurality of conductive elements 50 and sufficiently small to provide effective support for the plurality of conductive elements 50. Preferably, the cross-sectional area 144 has a height in a range of about 0.5 (one-half) inch to about 5.0 (five) inches. However, the cross-sectional area 144 may also have another suitable height.

The sidewall closeout area assembly 10 preferably has a modular design 146 (see FIG. 1A) that allows the sidewall closeout area assembly 10 to be easily configured to accommodate any aircraft layout. The sidewall closeout area assembly 10 is installed in and makes use of an unused volume 148 (see FIG. 1A) of the aircraft 16 and eliminates the congestion of wires 60 (see FIG. 1A) and cables 62 (see FIG. 1A), or other conductive elements 50, on the overfloor area 116 (see FIG. 1B) of the cabin 48 (see FIG. 1B). The sidewall closeout area assembly 10 provides for a floor penetration elimination 150 (see FIG. 1A) of unnecessary floor penetrations or holes 151 (see FIG. 2B) through a floor 152 (see FIG. 1B) or a ceiling 153 (see FIG. 1B) of the cabin 48. The sidewall closeout area assembly 10 further provides for variability elimination 154 (see FIG. 1A) in design and installation of systems routing 88 (see FIG. 1A) in aircraft 16, and provides a functional electrical conduit 156 (see FIG. 1A) through a length 158 (see FIG. 1B) of the cabin 48.

Now referring to FIG. 1B, in another version of the disclosure, there is provided the sidewall closeout area system 12 for a vehicle 14, such as an aircraft 16. As shown in FIG. 1B, the sidewall closeout area system 12 comprises the sidewall assembly 26. The sidewall assembly 26 is configured for installation, and is installed, in an interior 112 (see FIG. 1B) of the cabin 48 (see FIG. 1B), such as the passenger cabin 48a (see FIG. 1B), of the aircraft 16.

As shown in FIG. 1B, the sidewall assembly 26 comprises one or more sidewall panels 160 (see FIG. 1B). Each sidewall panel 160 (see FIGS. 1B, 3A) has a bottom end 162a (see FIGS. 1B, 3A) and a top end 162b (see FIGS. 1B, 3A), and an interior side 164a (see FIGS. 1B, 3A) and an exterior side 164b (see FIG. 1B). Each sidewall panel 160 is coupled or attached to one or more air grille panels 166 (see FIGS. 1B, 3A). Each air grille panel 166 has a bottom end 168a (see FIGS. 1B, 3A) and a top end 168b (see FIGS. 1B, 3A), and an interior side 170a (see FIGS. 1B, 3A) and an exterior side 170b (see FIG. 1B). Each air grille panel 166 has one or more air grille openings 172 (see FIGS. 1B, 3A). An air grille 174 (see FIGS. 1B, 5) is fitted and retained within each air grille opening 172. The first end 20 of the raceway 18 is configured to attach, and attaches, to the bottom end 168a of each of the air grille panels 166 of the sidewall assembly 26. The air grille panels 166 may also be referred to as decompression panels or decompression grilles or air vents.

As shown in FIG. 1B, the sidewall closeout area system 12 further comprises the sidewall closeout area assembly 10, which is coupled or attached to the sidewall assembly 26. As discussed above, the first end 20 of the raceway 18 is coupled or attached to the bottom portion 28 of the sidewall assembly 26, and in particular, is preferably coupled or attached to the bottom end 168a of each air grille panel 166. As discussed above with respect to FIG. 1A, the sidewall closeout area assembly 10 comprises the raceway 18 having the first end 20 attached to the bottom portion 28 of the sidewall assembly 26, the second end 22 attached to one or more aircraft floor structures 32, and the raceway body 24 formed between the first end 20 and the second end 22. The second end 22 of the raceway 18 is configured to attach, and attaches, to the one or more aircraft floor structures 32 (see FIG. 1B). As shown in FIG. 1B, the one or more aircraft floor structures 32 comprise one or more of, a fore-aft longitudinal floor grid structure 176, a longitudinal seat track 178, a floor panel 180, or another suitable aircraft floor structure.

As further discussed above, the raceway body 24 has the first side 34 facing the interior frame 38 (see FIG. 1B) of the aircraft 16 (see FIG. 1B), when the raceway 18 is coupled or attached to the sidewall assembly 26 in the aircraft 16. The raceway body 24 comprises the one or more first access openings 40 providing access to one or more of, the crown area 46 (see FIG. 1B) and the underfloor area 52 (see FIG. 1B), in the aircraft 16, for the plurality of conductive elements 50 (see FIG. 1B) routed along the raceway 18. The routing of the plurality of conductive elements 50 in the sidewall closeout area assembly 10 is meant to also allow for not having to route to the crown area 46.

As further discussed above, the sidewall closeout area assembly 10 comprises the raceway cover 90 removably coupled or attached to the raceway 18. The raceway cover 90 has the first cover side 108 facing the second side 36 of the raceway body 24, when the raceway cover 90 is coupled or attached to the raceway 18, and the raceway cover 90 has the second cover side 110 facing the interior 112 (see FIG. 1B) of the cabin 48 (see FIG. 1B), when the raceway cover 90 is coupled or attached to the raceway 18 in the aircraft 16 (see FIG. 1B). The raceway cover 90 comprises the one or more second access openings 114 providing access to the cabin 48 (see FIG. 1B) and providing access to the overfloor area 116 (see FIG. 1B) in the cabin 48, for the plurality of conductive elements 50 (see FIG. 1B) routed along the raceway 18.

As further discussed above, in one version, the raceway cover 90 of the sidewall closeout area assembly 10 may comprise two or more raceway cover sections 120 (see FIG. 1A) aligned adjacent to each other, and the one or more second access openings 114 are formed between end portions 122 (see FIG. 1A) of the adjacent raceway cover sections 120a (see FIG. 1A). In another version, the raceway cover 90 of the sidewall closeout area assembly 10 may comprise two or more raceway cover sections 120, and the sidewall closeout area assembly 10 may further comprise one or more breakout covers 124 (see FIG. 1A) positioned between the two or more raceway cover sections 120 and removably coupled or attached to the raceway 18. In this version, the one or more second access openings 114 comprise one or more breakout cover openings 126 (see FIG. 1A) formed in the one or more breakout covers 124.

As further discussed above, the sidewall closeout area assembly 10 comprises the closeout area 142, or space, formed between the raceway body 24 and the raceway cover 90. The closeout area 142 is configured to house and protect, and houses and protects, the plurality of conductive elements 50 routed along the raceway 18. The sidewall closeout area system 12 facilitates accessibility to the plurality of conductive elements 50, and provides a routing path 86 (see FIG. 1B) for the plurality of conductive elements 50 that does not need to be reconfigured for different aircraft cabin layouts 87 (see FIG. 1B).

In addition, the sidewall closeout area assembly 10 (see FIGS. 1A-1B) has the advantage of improving a bend radius 194 (see FIG. 1B) of the plurality of conductive elements 50 (see FIG. 1B), for example, wires 60 (see FIG. 1A) and cables 62 (see FIG. 1A), by allowing the wires 60 and cables 62 to bend or turn more easily out of the first access openings 40 (see FIG. 1A) and the second access openings 114 (see FIG. 1A), including the breakout cover openings 126 (see FIG. 1A), to the crown area 46 (see FIG. 1B), to the underfloor area 52 (see FIG. 1B), to the interior 112 (see FIG. 1B) of the cabin 48 (see FIG. 1B), to the overfloor area 116 (see FIG. 1B), to the seat shroud 188 (see FIG. 1B), and/or to the seat legs 184 (see FIG. 1B).

As further shown in FIG. 1B, the vehicle 14, such as the aircraft 16, includes in the cabin 48, such as the passenger cabin 48, a plurality of seats 182 for passengers. The seats 182 may be in the form of palletized seats 182a that are reconfigurable to change seat pitches of the seats 182, and that are reconfigurable along the longitudinal seat tracks 178. As further shown in FIG. 1B, the seats 182 have seat legs 184, seat track covers 186 to cover the longitudinal seat tracks 178, and seat shrouds 188. In addition to the raceway cover 90 (see FIG. 1A) that preferably prevents moisture and debris from falling inside or entering the closeout area 142 (see FIG. 1A) of the sidewall closeout area assembly 10, the aircraft 16 may include a mopsill 190 (see FIG. 1B) and a seal 192 (see FIG. 1B), such as a bulb seal, to facilitate routing any moisture and debris out of the bottom portion 28 (see FIG. 1A) of the sidewall assembly 26 (see FIG. 1A) and away from interior of the sidewall closeout area assembly 10. The mopsill 190 may run on the outboard side of the floor panel 180 (see FIG. 1B) and also provides a drain guide.

Figure 2A:
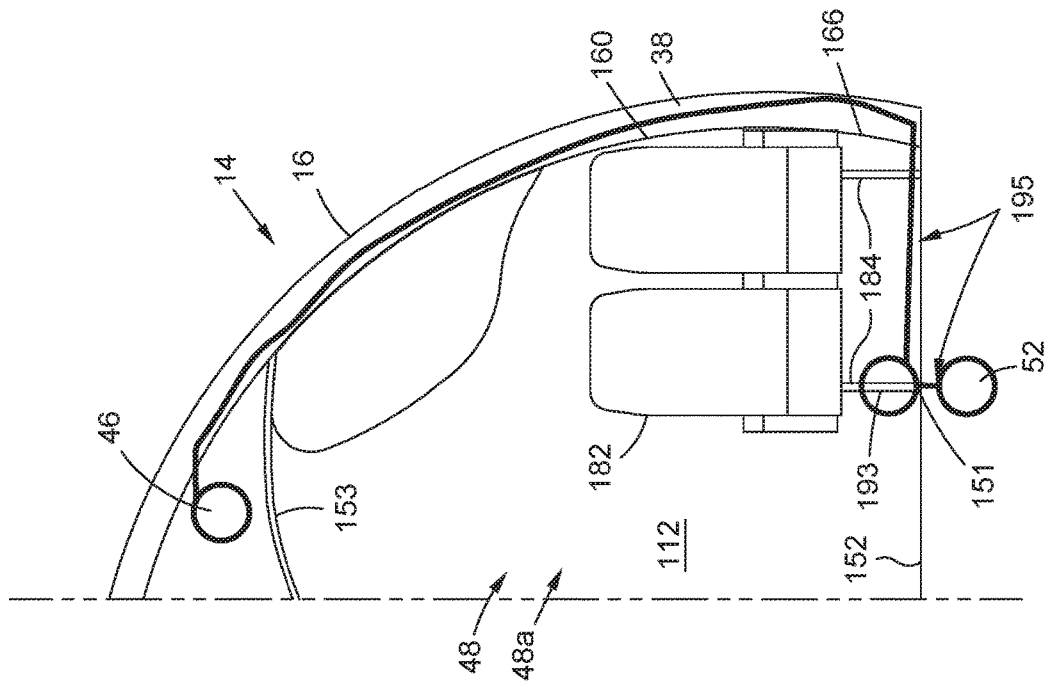
FIG. 2A is an illustration of a back cross-sectional view of a cabin of an aircraft showing a routing path accessing a crown area and accessing an underfloor area, via a sidewall closeout area assembly of the disclosure.

Now referring to FIG. 2A, FIG. 2A is an illustration of a back cross-sectional view of a cabin 48, such as a passenger cabin 48a, of a vehicle 14, such as an aircraft 16, showing a routing path 86 for the plurality of conductive elements 50 (see FIG. 1A) accessing a crown area 46 and accessing an underfloor area 52, via the sidewall closeout area assembly 10 of the disclosure. As shown in FIG. 2A, the cabin 48 has a floor 152, a ceiling 153, seats 182 with seat legs 184, the sidewall assembly 26 with the sidewall panel 160 and the air grille panel 166, and the sidewall closeout area assembly 10, in the interior 112 of the cabin 48. As shown in FIG. 2A, the routing path 86 runs along the interior frame 38 of the aircraft 16 from the sidewall closeout area assembly 10 to the crown area 46 of the aircraft 16. The routing of the plurality of conductive elements 50 (see FIG. 1A) in the sidewall closeout area assembly 10 is meant to also allow for not having to route to the crown area 46, but may be optionally routed to the crown area 46, if desired. As further shown in FIG. 2A, the routing path 86 runs from the sidewall closeout area assembly 10 to the underfloor area 52 of the aircraft 16 and does not penetrate through the floor 152 of the cabin 48.

Figure 2B:
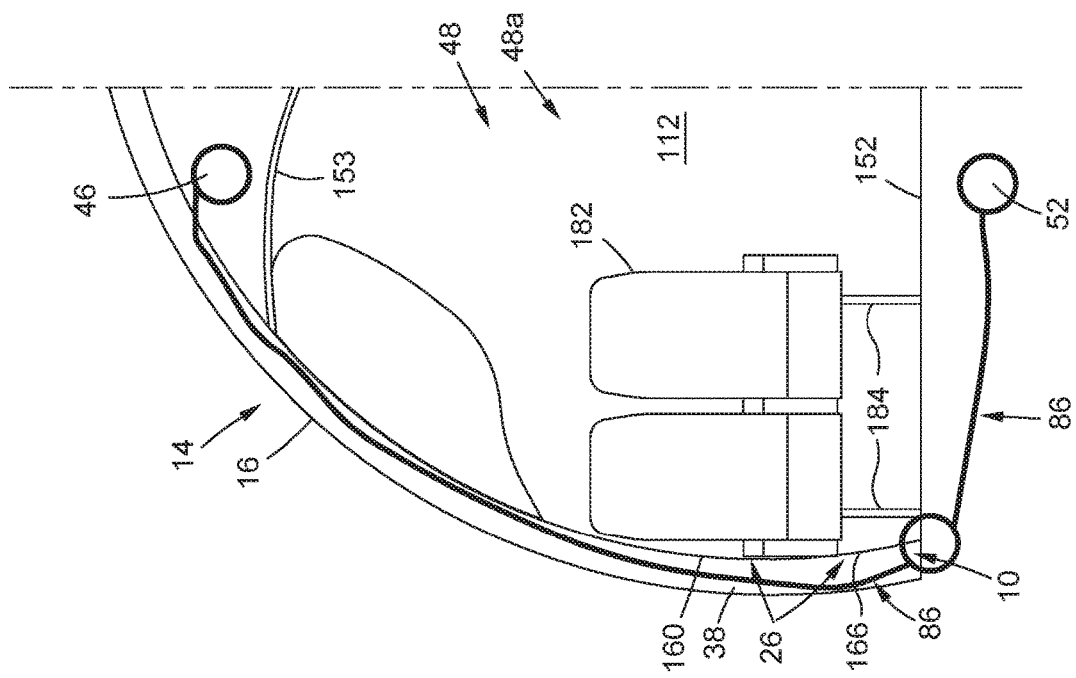
FIG. 2B is an illustration of a back cross-sectional view of a cabin of an aircraft showing a known routing path accessing an underfloor area, via a hole in a floor at an inboard seat leg area, and accessing a crown area.

Now referring to FIG. 2B, FIG. 2B is an illustration of a back cross-sectional view of a cabin 48, such as a passenger cabin 48a, of a vehicle 14, such as an aircraft 16, showing a known routing path 195 accessing a crown area 46 and accessing an underfloor area 52, via a hole 151 in the floor 152, at an inboard seat leg area 193. FIG. 2B shows the seats 182 with seat legs 184, the sidewall panel 160, and the air grille panel 166 in the interior 112 of the cabin 48. As shown in FIG. 2B, the known routing path 195 runs along the interior frame 38 of the aircraft 16 from the crown area 46 to the inboard seat leg area 193 and penetrates through the floor 152 of the cabin 48 to the underfloor area 52. The known routing path 195 through the floor 152 causes variation in the floor panels 180 (see FIG. 1B), holes 151 in the floor 152, floor covering protrusions, and variation.

Figure 3A:
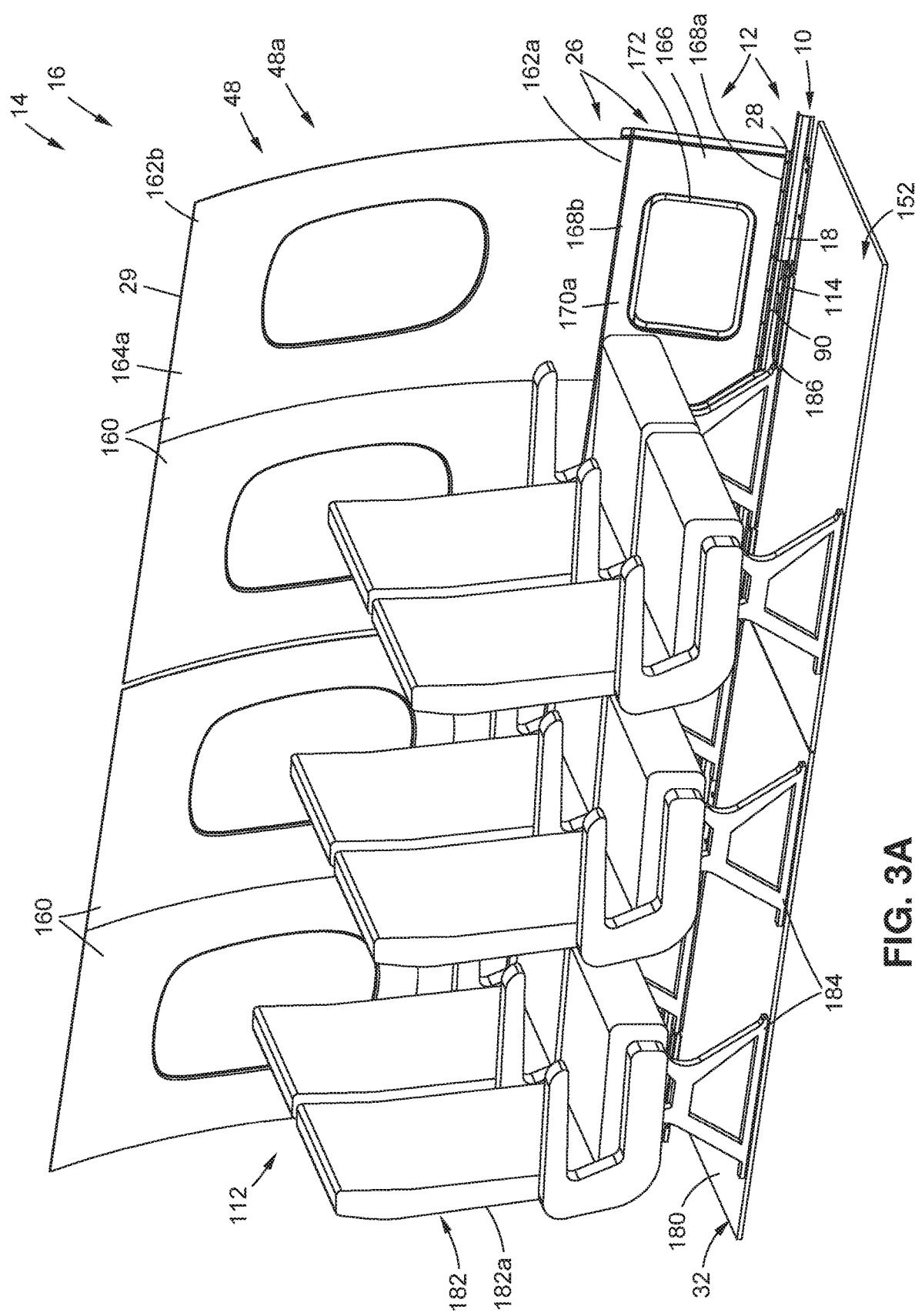
FIG. 3A is an illustration of a front perspective view of a cabin of an aircraft showing a version of a sidewall closeout area system with a sidewall closeout area assembly of the disclosure.

Now referring to FIG. 3A, FIG. 3A is an illustration of a front perspective view of a cabin 48, such as a passenger cabin 48a, of a vehicle 14, such as an aircraft 16 showing a version of the sidewall closeout area system 12 with the sidewall closeout area assembly 10 of the disclosure. As shown in FIG. 3A, the seats 182 are in the form of palletized seats 182a with one set of seat legs 184, retained in a longitudinal seat track 178 (see FIG. 6A) having a seat track cover 186, along aircraft floor structures 32 in the form of floor panels 180 forming the floor 152 in the interior 112 of the cabin 48. FIG. 3A shows the sidewall closeout area system 12 comprising the sidewall closeout area assembly 10 coupled or attached to the bottom portion 28 of the sidewall assembly 26. FIG. 3A shows the top portion 29 of the sidewall assembly 26 and shows the sidewall assembly 26 comprising sidewall panels 160 with a bottom end 162a, a top end 162b, and an interior side 164a. As shown in FIG. 3A, the sidewall panels 160 are coupled or attached to air grille panels 166 having a bottom end 168a, a top end 168b, and an interior side 170a. Each air grille panel 166 has an air grille opening 172 (see FIG. 3A), and preferably, the bottom end 168a of the air grille panels 166 is coupled or attached to the sidewall closeout area assembly 10. FIG. 3A further shows the raceway 18, and the raceway cover 90 coupled to the raceway 18, of the sidewall closeout area assembly 10. The raceway cover 90 has the second access opening 114 (see FIG. 3A).

Figure 3B:
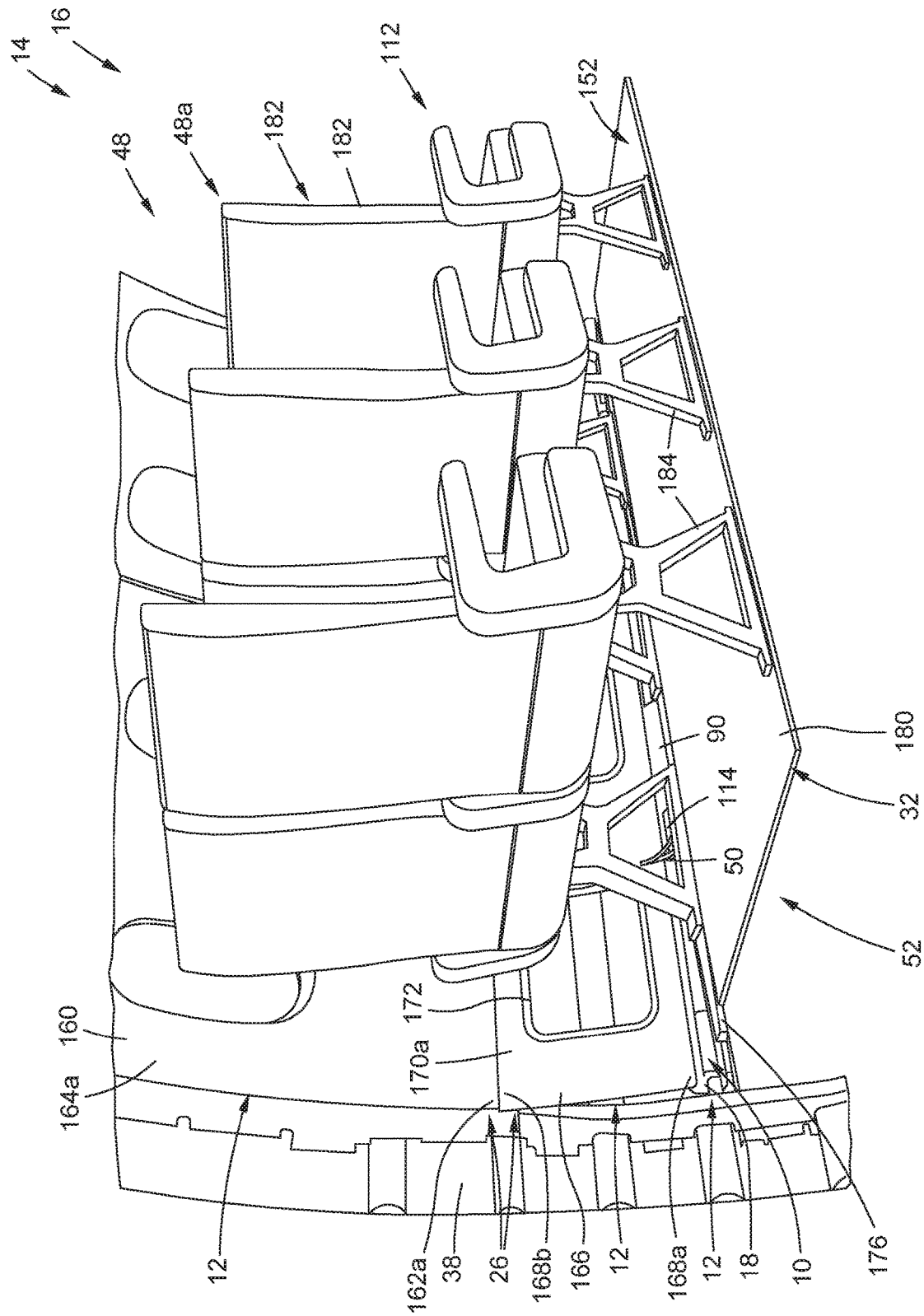
FIG. 3B is an illustration of a back perspective view of the cabin of FIG. 3A showing the sidewall closeout area system with the sidewall closeout area assembly.

Now referring to FIG. 3B, FIG. 3B is an illustration of a back perspective view of the cabin 48, such as the passenger cabin 48a, of FIG. 3A, of the vehicle 14, such as the aircraft 16, showing the sidewall closeout area system 12 with the sidewall closeout area assembly 10. FIG. 3B shows the seats 182, such as palletized seats 182a, with one set of seat legs 184 retained in the longitudinal seat track 178 (see FIG. 6A) along aircraft floor structures 32 in the form of floor panels 180 forming the floor 152 in the interior 112 of the cabin 48. FIG. 3B further shows the underfloor area 52 under the floor 152 and under the seats 182. FIG. 3B shows the sidewall closeout area system 12 comprising the sidewall closeout area assembly 10 coupled or attached to the bottom end 168a of the air grille panels 166 of the sidewall assembly 26. FIG. 3B further shows the top end 168b, the interior side 170a, and the air grille opening 172 of the air grille panel 166, and shows the top end 168b coupled or attached to the bottom end 162a of the sidewall panel 160. FIG. 3B shows the interior side 164a of the sidewall panel 160. FIG. 3B further shows the raceway 18, and the raceway cover 90 coupled to the raceway 18, of the sidewall closeout area assembly 10. The raceway cover 90 has the second access opening 114 (see FIG. 3B) with the plurality of conductive elements 50 (see FIG. 3B), such as, for example, wires 60 (see FIG. 1A) and/or cables 62 (see FIG. 1A), or other conductive elements 50 routing out of the second access opening 114. As shown in FIG. 3B, the raceway 18 is coupled or attached to the fore-aft longitudinal floor grid structure 176.

Figure 4:
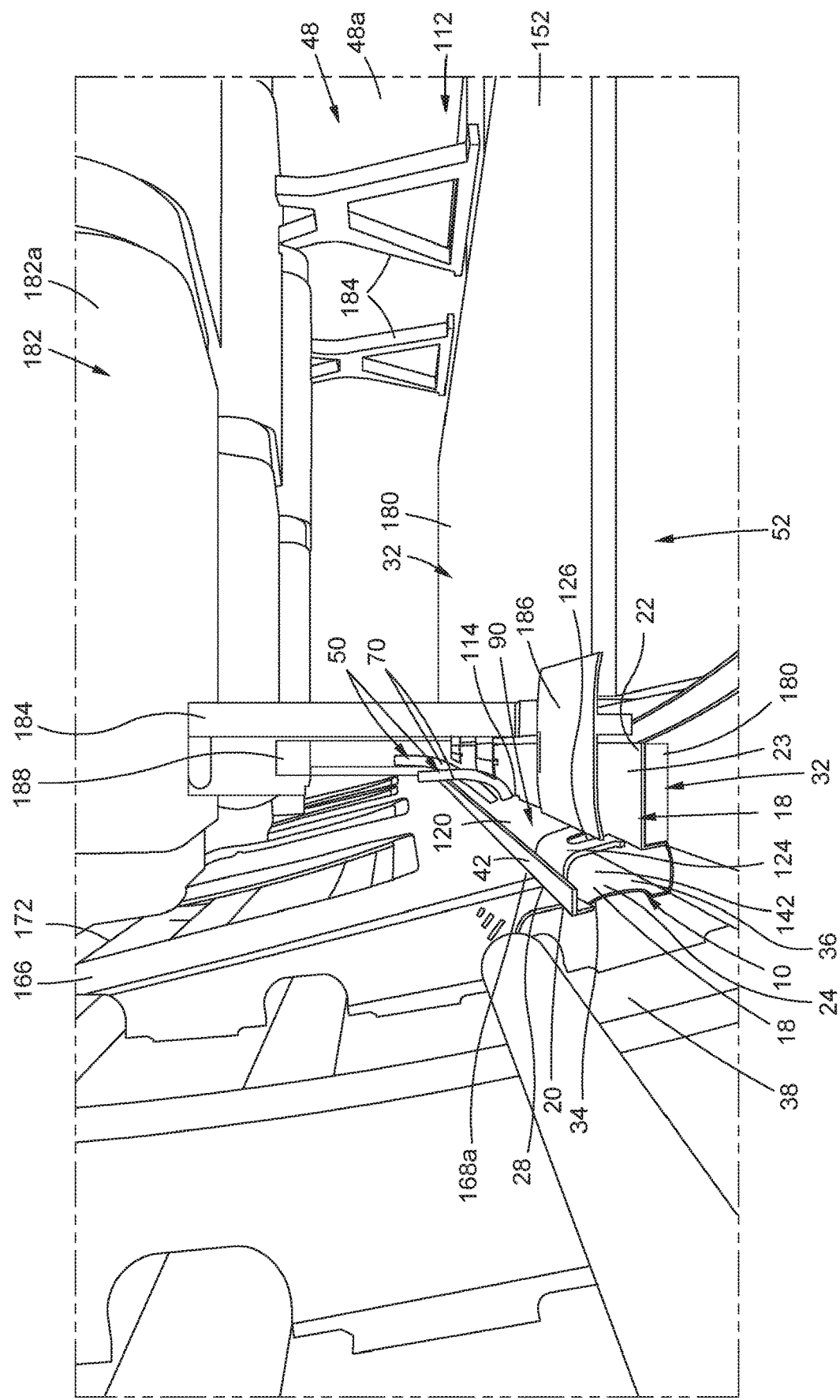
FIG. 4 is an illustration of a back perspective close-up view of a version of a sidewall closeout area assembly coupled between an air grille panel and an aircraft floor structure.

Now referring to FIG. 4, FIG. 4 is an illustration of a back perspective close-up view of a version of the sidewall closeout area assembly 10 of the disclosure coupled or attached between the bottom portion 28 of the sidewall assembly 26 (see FIG. 3A), such as the bottom end 168a of the air grille panel 166, and the aircraft floor structure 32, such as the floor panel 180, in the interior 112 of the cabin 48, such as the passenger cabin 48a. FIG. 4 shows the air grille opening 172 of the air grille panel 166. FIG. 4 shows the seats 182, such as palletized seats 182a, with one set of seat legs 184 having a bottom end adjacent the seat track cover 186, where the seat track cover is configured to cover a longitudinal seat track 178 (see FIG. 6A), positioned along aircraft floor structures 32, in the form of floor panels 180, forming the floor 152 in the interior 112 of the cabin 48. FIG. 4 further shows the underfloor area 52 under the floor 152 and under the seats 182. FIG. 4 shows the sidewall closeout area assembly 10 comprising the raceway 18, the raceway cover 90, the breakout cover 124, and the closeout area 142.

FIG. 4 further shows the raceway 18 having a first end 20, a second end 22, a raceway track portion 23, and a raceway body 24 having a first side 34 facing the interior frame 38 and having a second side 36 facing the raceway cover 90. FIG. 4 further shows a flange portion 42 of the raceway body 24 extending inwardly and extending along a length 44 (see FIG. 1A) of the raceway 18. FIG. 4 further shows the second access opening 114 of the raceway cover 90 with the plurality of conductive elements 50, such as a plurality of electrical runs 70, routing out of the second access opening 114 into a seat shroud 188 coupled to a seat leg 184. FIG. 4 further shows a raceway cover section 120 of the raceway cover 90 adjacent to the breakout cover 124. The breakout cover 124 has a breakout cover opening 126. In this version of the raceway 18, as shown in FIG. 4, the raceway 18, for example, the raceway track portion 23, may be attached, or coupled, to a top surface of the aircraft floor structure 32, such as the floor panel 180, with a plurality of attachment elements 30 (see FIG. 1A), for example, brackets 30a (see FIG. 1A), clips 30b (see FIG. 1A), bolts 30c (see FIG. 1A), or other suitable attachment elements, or may be attached with tape or bonded with adhesive, or may be attached with another suitable means of attachment.

Figure 5:
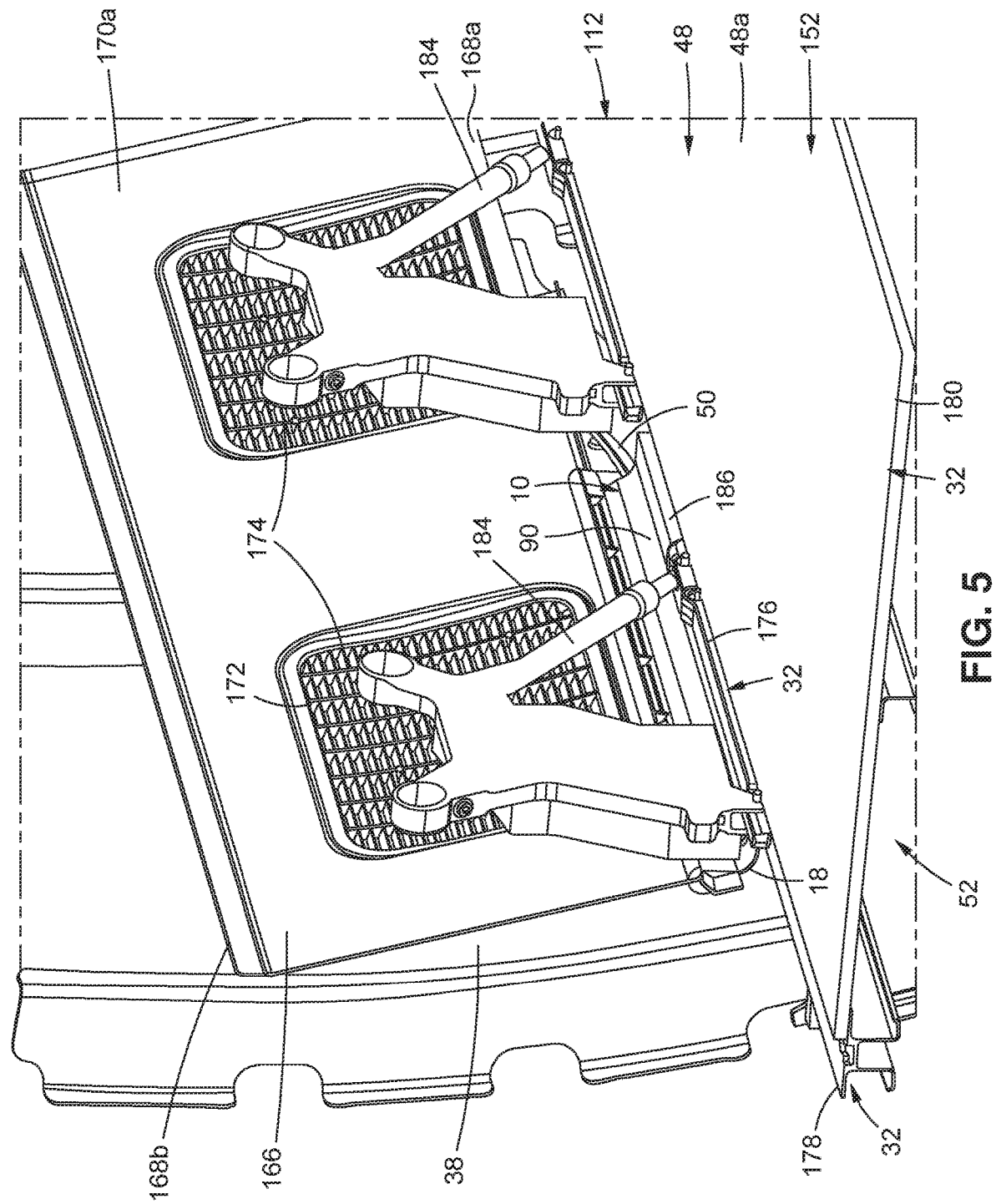
FIG. 5 is an illustration of an inboard side perspective close-up view of a version of a sidewall closeout area assembly of the disclosure coupled to an air grille panel with air grilles installed.

Now referring to FIG. 5, FIG. 5, FIG. 5 is an illustration of a side perspective close-up view of a version of the sidewall closeout area assembly 10 of the disclosure coupled to an air grille panel 166 with air grilles 174 installed in air grille openings 172 of the air grille panel 166. FIG. 5 shows the sidewall closeout area assembly 10 coupled or attached between the bottom end 168a of the air grille panel 166, and the aircraft floor structure 32, such as the fore-aft longitudinal floor grid structure 176, in the interior 112 of the cabin 48, such as the passenger cabin 48a. FIG. 5 also shows the top end 168b and the interior side 170a of the air grille panel 166. The interior frame 38 (see FIG. 5) is positioned behind, or outboard from, the air grille panel 166 and the sidewall closeout area assembly 10. FIG. 5 shows the seat legs 184 retained in the aircraft floor structure 32, such as the longitudinal seat track 178, along the aircraft floor structure 32, in the form of the floor panel 180, which is part of the floor 152 in the interior 112 of the cabin 48. FIG. 5 further shows the seat track cover 186 over the longitudinal seat track 178. FIG. 5 further shows the underfloor area 52 under the floor panel 180. FIG. 5 shows the sidewall closeout area assembly 10 comprising the raceway 18 and the raceway cover 90 coupled or attached to the raceway 18. FIG. 5 further shows the plurality of conductive elements 50 routed through the sidewall closeout area assembly 10.

Figure 6A:
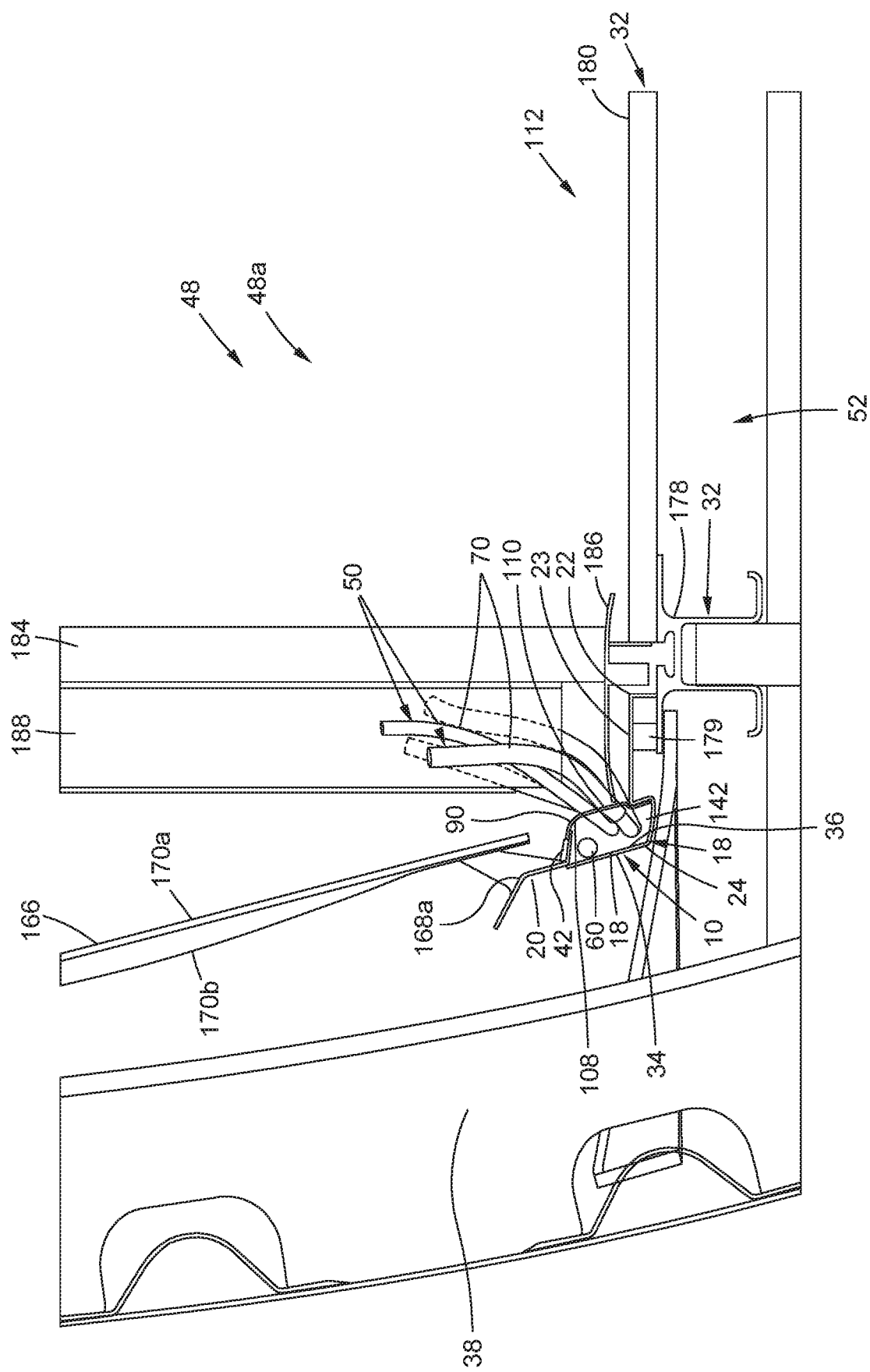
FIG. 6A is an illustration of a back cross-sectional close-up view of a version of a sidewall closeout area assembly with a version of a raceway, and with a plurality of conductive elements routed through the sidewall closeout area assembly into a seat shroud.

Now referring to FIG. 6A, FIG. 6A is an illustration of a back cross-sectional close-up view of a version of the sidewall closeout area assembly 10 with a plurality of conductive elements 50, such as in the form of a plurality of electrical runs 70, routed through the sidewall closeout area assembly 10 into a seat shroud 188, which is adjacent the seat leg 184 in the interior 112 of the cabin 48, such as the passenger cabin 48a. FIG. 6A shows the seat leg 184 retained in the longitudinal seat track 178, along the aircraft floor structure 32, in the form of floor panel 180, positioned above the underfloor area 52. FIG. 6A further shows the seat track cover 186 covering over the longitudinal seat track 178. FIG. 6A shows the sidewall closeout area assembly 10 coupled, or attached, between the bottom end 168a of the air grille panel 166 and the aircraft floor structure 32, such as the longitudinal seat track 178. FIG. 6A shows the interior side 170a and the exterior side 170b of the air grille panel 166, where the interior side 170a faces the seat shroud 188 and the exterior side 170b faces the interior frame 38 of the aircraft 16 (see FIG. 1B).

FIG. 6A shows the sidewall closeout area assembly 10 comprising the raceway 18, the raceway cover 90, and the closeout area 142. FIG. 6A further shows the raceway 18 with the first end 20 coupled, or attached, to the bottom end 168a of the air grille panel 166, the raceway body 24, the raceway track portion 23, and the second end 22 coupled, or attached, to the longitudinal seat track 178. The raceway body 24 has the first side 34 (see FIG. 6A) facing the interior frame 38 (see FIG. 6A) and has the second side 36 (see FIG. 6A) facing the first cover side 108 (see FIG. 6A) of the raceway cover 90 (see FIG. 6A). As shown in FIG. 6A, the second cover side 110 of the raceway cover 90 faces the interior 112 of the cabin 48 and faces the seat leg 184 and the seat shroud 188. FIG. 6A further shows the flange portion 42 of the raceway body 24 extending inwardly toward the interior 112 of the cabin 48. In one version the raceway cover 90 is coupled to the raceway 18 by snap fitting the raceway cover 90 to an aircraft floor structure 32 and fitting under the flange portion 42.

In this version of the raceway 18, as shown in FIG. 6A, the floor panel 180 under the raceway track portion 23, such as shown in FIG. 4, is replaced with a part, for example, a support pad 179, under the raceway track portion 23 of the raceway 18. As shown in FIG. 6A, in this version of the raceway 18, the raceway track portion 23 and the support pad 179 are preferably attached to the aircraft floor structure 32, such as the longitudinal seat track 178, for example, a seat track flange of the longitudinal seat track 178. The raceway 18, such as the raceway track portion 23, and the support pad 179 may be attached, or coupled, to a top surface of the longitudinal seat track 178, with a plurality of attachment elements 30 (see FIG. 1A), for example, brackets 30a (see FIG. 1A), clips 30b (see FIG. 1A), bolts 30c (see FIG. 1A), fasteners, or other suitable attachment elements, or may be attached with tape or bonded with adhesive, or may be attached with another suitable means of attachment.

Figure 6B:
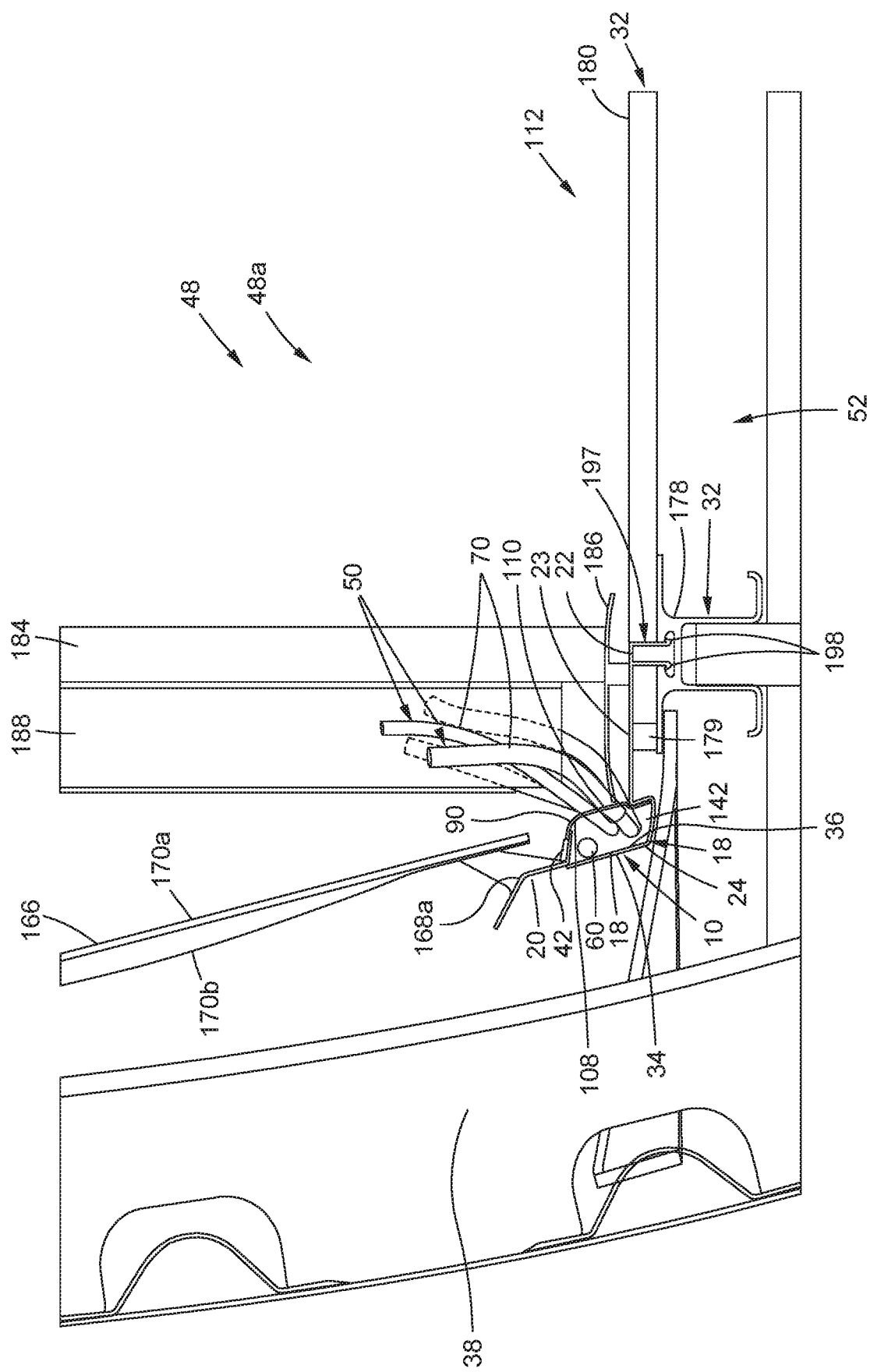
FIG. 6B is an illustration of a back cross-sectional close-up view of a version of a sidewall closeout area assembly with another version of a raceway, and with a plurality of conductive elements routed through the sidewall closeout area assembly into a seat shroud.

Now referring to FIG. 6B, FIG. 6B is an illustration of a back cross-sectional close-up view of a version of a sidewall closeout area assembly 10 with another version of a raceway 18, and with a plurality of conductive elements 50, such as in the form of a plurality of electrical runs 70, routed through the sidewall closeout area assembly 10 into a seat shroud 188, which is adjacent the seat leg 184 in the interior 112 of the cabin 48, such as the passenger cabin 48a. FIG. 6B shows the seat leg 184 retained in the longitudinal seat track 178, along the aircraft floor structure 32, in the form of floor panel 180, positioned above the underfloor area 52. FIG. 6B further shows the seat track cover 186 covering over the longitudinal seat track 178. FIG. 6B shows the sidewall closeout area assembly 10 coupled, or attached, between the bottom end 168a of the air grille panel 166 and the aircraft floor structure 32, such as the longitudinal seat track 178. FIG. 6B shows the interior side 170a and the exterior side 170b of the air grille panel 166, where the interior side 170a faces the seat shroud 188 and the exterior side 170b faces the interior frame 38 of the aircraft 16 (see FIG. 1B).

FIG. 6B shows the sidewall closeout area assembly 10 comprising the raceway 18, the raceway cover 90, and the closeout area 142. FIG. 6B further shows the raceway 18 with the first end 20 coupled, or attached, to the bottom end 168a of the air grille panel 166, the raceway body 24, the raceway track portion 23, and the second end 22 coupled, or attached, to the longitudinal seat track 178. The raceway body 24 has the first side 34 (see FIG. 6B) facing the interior frame 38 (see FIG. 6B) and has the second side 36 (see FIG. 6B) facing the first cover side 108 (see FIG. 6B) of the raceway cover 90 (see FIG. 6B). As shown in FIG. 6B, the second cover side 110 of the raceway cover 90 faces the interior 112 of the cabin 48 and faces the seat leg 184 and the seat shroud 188. FIG. 6B further shows the flange portion 42 of the raceway body 24 extending inwardly toward the interior 112 of the cabin 48. In one version the raceway cover 90 is coupled to the raceway 18 by snap fitting the raceway cover 90 to an aircraft floor structure 32 and fitting under the flange portion 42.

In this version of the raceway 18, as shown in FIG. 6B, like the version of the raceway 18 shown in FIG. 6A, the support pad 179 is included and replaces the floor panel 180 under the raceway track portion 23, such as shown in FIG. 4, and combines it with a snap-in connector portion 197 at the second end 22 of the raceway 18. As shown in FIG. 6B, in this version, the snap-in connector portion 197 comprises two snap-in legs 198 positioned opposite each other and designed to snap-in and fit into a top opening in the longitudinal seat track 178, and abut against the sides of the top opening. With the snap-in connector portion 197 of the raceway 18, no additional fasteners, tape, or other attachment means may be needed. However, the support pad 179 may optionally be attached, or coupled, to a top surface of the longitudinal seat track 178, with a plurality of attachment elements 30 (see FIG. 1A), for example, brackets 30a (see FIG. 1A), clips 30b (see FIG. 1A), bolts 30c (see FIG. 1A), fasteners, or other suitable attachment elements, or may be attached with tape or bonded with adhesive, or may be attached with another suitable means of attachment.

Figure 7:
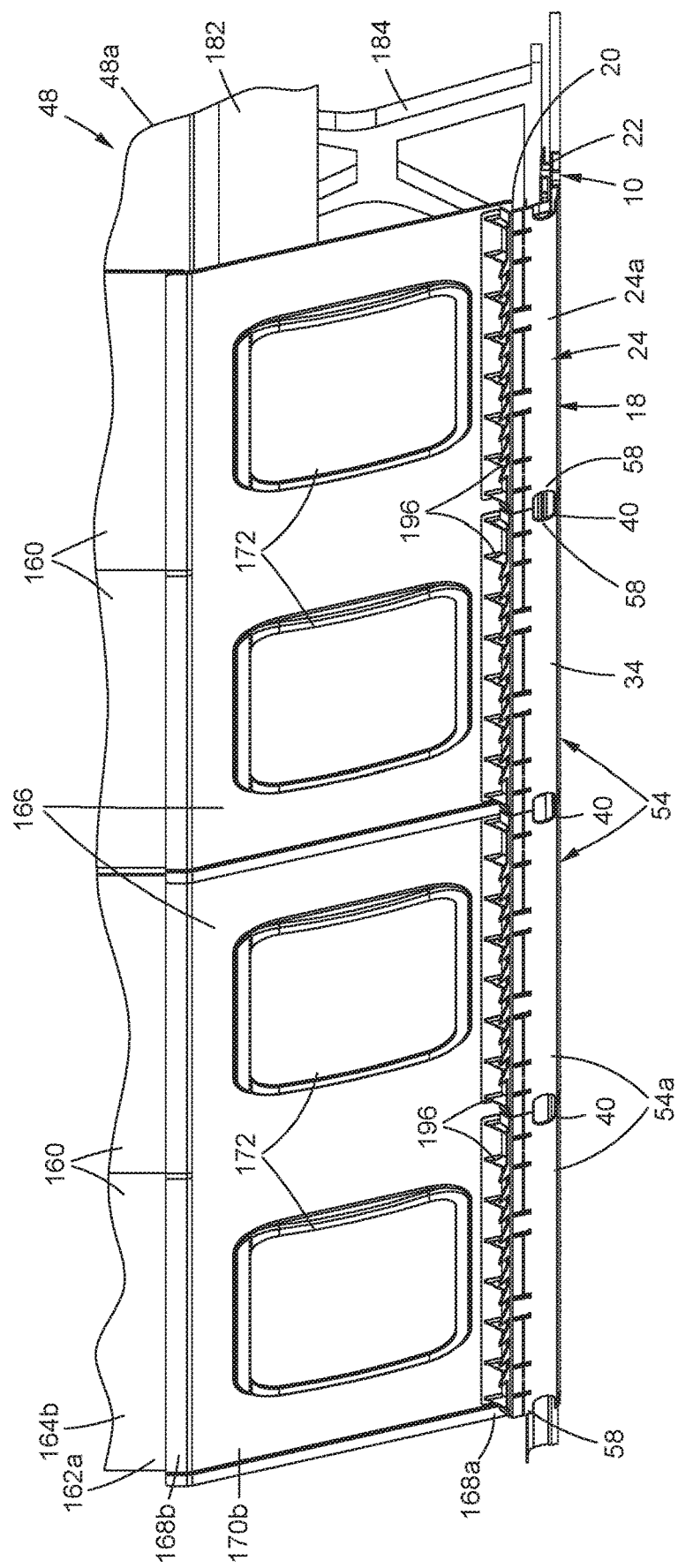
FIG. 7 is an illustration of an outboard side perspective close-up view of a version of a sidewall closeout area assembly of the disclosure coupled to air grille panels.

Now referring to FIG. 7, FIG. 7 is an illustration of an outboard side perspective close-up view of a version of the sidewall closeout area assembly 10 of the disclosure coupled, or attached, to the bottom ends 168a of the air grille panels 166 in the cabin 48, such as the passenger cabin 48a. FIG. 7 shows the top ends 168b, the exterior sides 170b, the air grille openings 172, and fin portions 196 of the air grille panels 166. The fin portions 196 facilitate air flow from the cabin 48 to under and through the air grille panels 166. FIG. 7 further shows the top end 168b of the air grille panels 166 coupled or attached to the bottom ends 162a of the sidewall panels 160. FIG. 7 further shows the exterior sides 164b of the sidewall panels 160 and a seat 182 with the seat leg 184. FIG. 7 shows the first end 20 of the raceway 18 of the sidewall closeout area assembly 10 coupled, or attached, to the bottom ends of the air grille panels 166, and shows the second end 22 of the raceway 18. FIG. 7 further shows the first side 34 of the raceway body 24, such as the elongated raceway body 24a. In this version, the raceway body 24 is comprised of raceway body sections 54, and FIG. 7 shows four (4) raceway body sections 54. The first access openings 40 (see FIG. 7) are formed between end portions 58 (see FIG. 7) of adjacent raceway body sections 54a (see FIG. 7).

Figure 8:
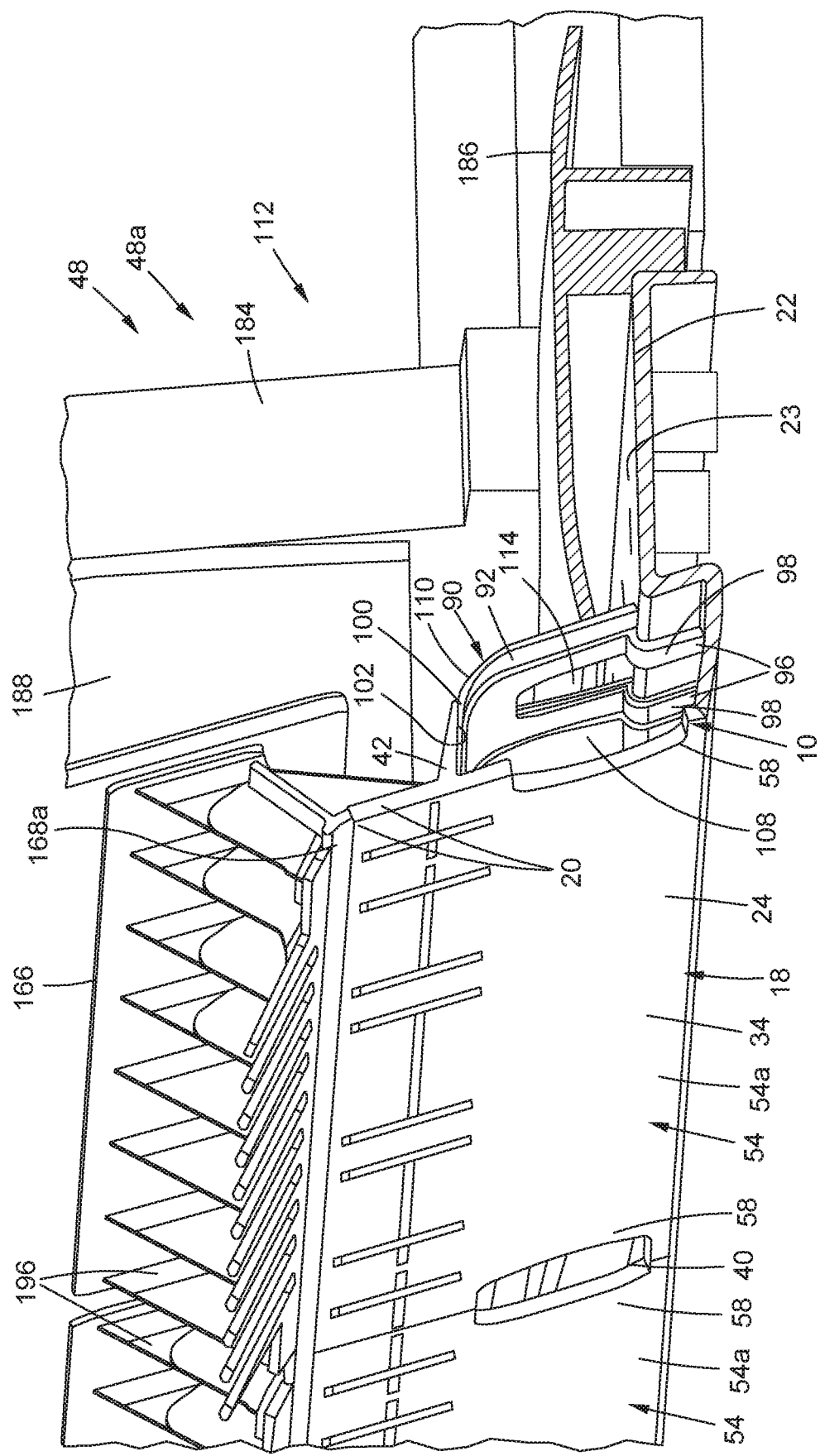
FIG. 8 is an illustration of a back outboard side perspective close-up view of a version of a sidewall closeout area assembly of the disclosure showing a snap-in raceway cover coupled to a raceway and an aircraft floor structure.

Now referring to FIG. 8, FIG. 8 is an illustration of a back outboard side perspective close-up view of a version of a sidewall closeout area assembly 10 of the disclosure showing a raceway cover 90, in the form of a snap-in raceway cover 92, coupled to the raceway 18. As shown in FIG. 8, in one version, the raceway cover 90, in the form of the snap-in raceway cover 92, has a bottom end 96 with tab members 98 coupled, and snap fitted, to the raceway track portion 23 of the raceway 18. As further shown in FIG. 8, the raceway cover 90, in the form of the snap-in raceway cover 92, has a top end 100 coupled to, and fitted against, an underside 102 of the flange portion 42 of the raceway 18. No additional fastener elements or attachment elements are needed to couple or snap fit the raceway cover 90 to the raceway 18. The second access opening 114 (see FIG. 8) is formed through the raceway cover 90, and the first cover side 108 (see FIG. 8) of the raceway cover 90 faces the raceway body 24 (see FIG. 8) of the raceway 18, and the second cover side 110 (see FIG. 8) of the raceway cover 90 faces the interior 112 of the cabin 48, such as the passenger cabin 48a.

FIG. 8 shows the first end 20 of the raceway 18 coupled, or attached, to the bottom end 168a of the air grille panel 166, and shows the second end 22 of the raceway 18. FIG. 8 shows the fin portions 196 of the air grille panel 166, and the first side 34 of the raceway body 24. FIG. 8 further shows the raceway body 24 comprised of raceway body sections 54, and FIG. 8 shows two (2) raceway body sections 54. The first access opening 40 (see FIG. 8) is formed between end portions 58 (see FIG. 8) of adjacent raceway body sections 54a (see FIG. 8). FIG. 8 further shows the seat leg 184, the seat shroud 188, and the seat track cover 186.

Figure 9:
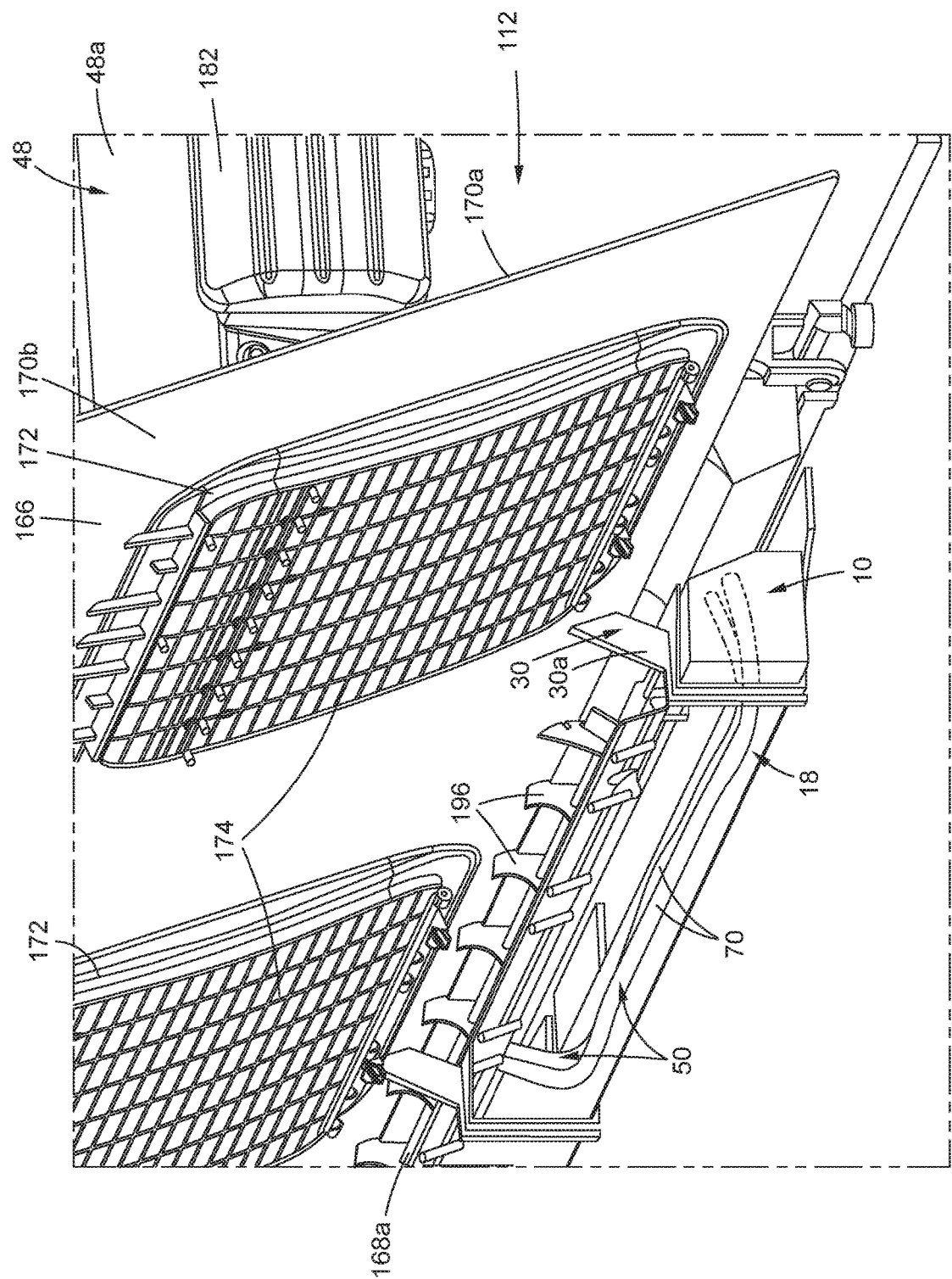
FIG. 9 is an illustration of a back side perspective close-up view of another version of a sidewall closeout area assembly of the disclosure showing a bracket coupled to a raceway of the sidewall closeout area assembly.

Now referring to FIG. 9, FIG. 9 is an illustration of a back side perspective close-up view of another version of a sidewall closeout area assembly 10 of the disclosure showing an attachment element 30, such as in the form of a bracket 30a, coupled to the raceway 18 of the sidewall closeout area assembly 10. The plurality of conductive elements 50 (see FIG. 9), such as in the form of the plurality of electrical runs 70 (see FIG. 9) are routed along the raceway 18 of the sidewall closeout area assembly 10. As shown in FIG. 9, the sidewall closeout area assembly 10 is coupled, or attached, to the bottom end 168a of the air grille panel 166 in the cabin 48, such as the passenger cabin 48a. FIG. 9 shows the interior side 170a, the exterior side 170b, the air grille openings 172, and the air grilles 174 of the air grille panel 166, and shows the fin portions 196. The interior side 170a of the air grille panel 166 faces the interior 112 of the cabin 48. FIG. 9 further shows the seat 182 in the interior 112 of the cabin 48.

Figure 10A:
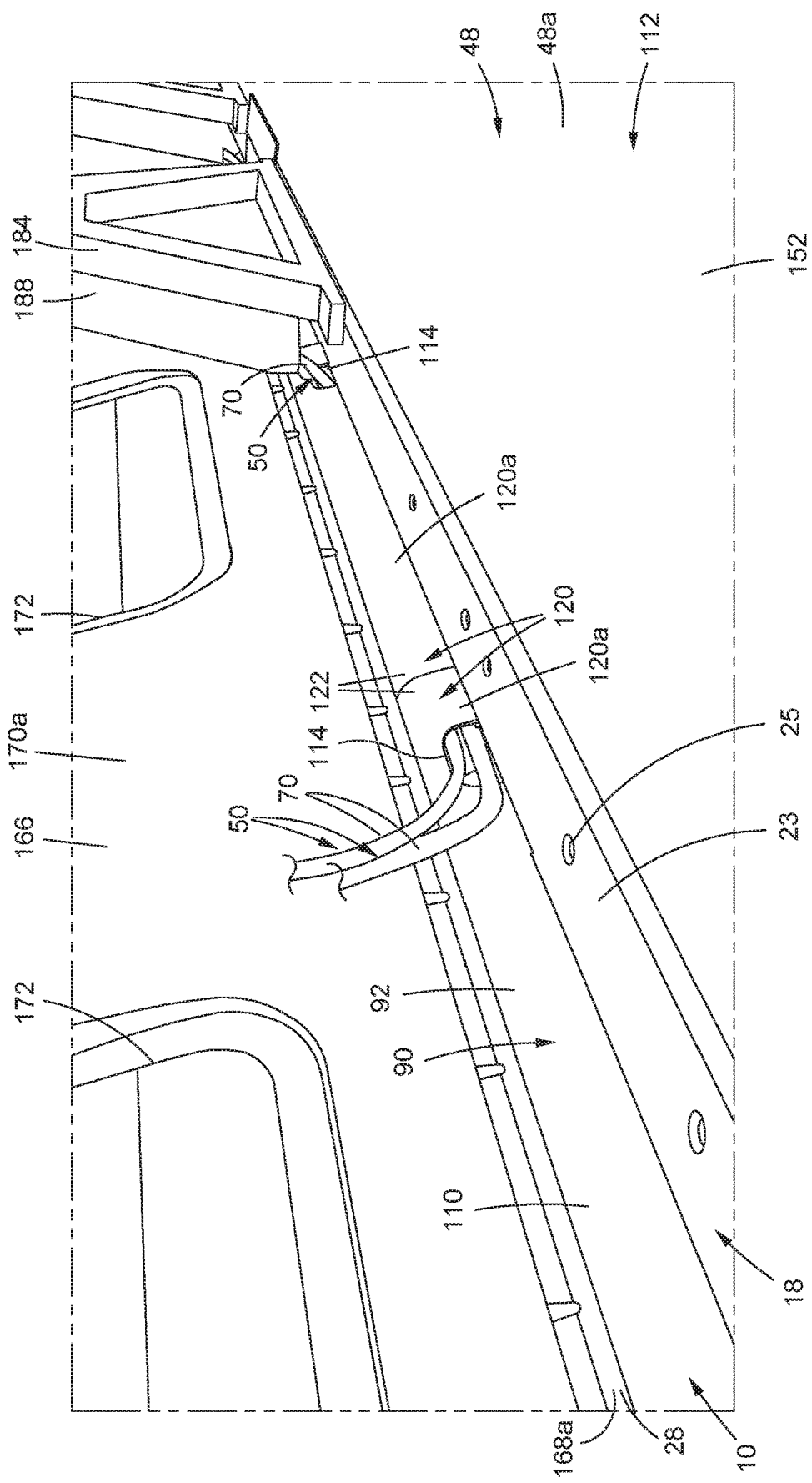
FIG. 10A is an illustration of an inboard side perspective close-up view of a version of a sidewall closeout area assembly of the disclosure showing adjacent raceway cover sections.

Now referring to FIG. 10A, FIG. 10A is an illustration of an inboard side perspective close-up view of a version of a sidewall closeout area assembly 10 of the disclosure showing adjacent raceway cover sections 120a with second access openings 114. As shown in FIG. 10A, the second access openings 114 provide access to, and routing for, the plurality of conductive elements 50, such as in the form of the plurality of electrical runs 70, from the closeout area 142 (see FIGS. 1A, 4) of the sidewall closeout area assembly 10 to the interior 112 of the cabin 48, such as the passenger cabin 48a. In this version, as shown in FIG. 10A, the raceway cover 90, such as in the form of the snap-in raceway cover 92, comprises two or more raceway cover sections 120 aligned adjacent to each other in the longitudinal fore-aft direction 56 (see FIG. 1A). As shown in FIG. 10A, end portions 122 of the raceway cover sections 120 are aligned adjacent to each other. As further shown in FIG. 10A, in this version, the raceway cover 90 is coupled, or snap fitted, between the bottom portion 28 of the sidewall assembly 26 (see FIGS. 1A, 3A), and in particular, the bottom end 168a of the air grille panel 166, and the floor 152 of the cabin 48. FIG. 10A further shows the second cover side 110 of the raceway cover 90 facing the interior 112 of the cabin 48, and facing the seat shroud 188 and the seat leg 184. FIG. 10A further shows the raceway track portion 23 of the raceway 18, where the raceway track portion 23 has a plurality of openings 25 formed through, and along, the length of the raceway track portion 23. Each of the plurality of openings 25 may be configured to receive an attachment element 30 (see FIG. 1A), for attaching the raceway track portion 23 to an aircraft floor structure 32 (see FIG. 1B), such as a floor panel 180 (see FIG. 1B), or to the floor 152 (see FIG. 10A). FIG. 10A further shows the interior side 170a and the air grille openings 172 of the air grille panel 166.

Figure 10B:
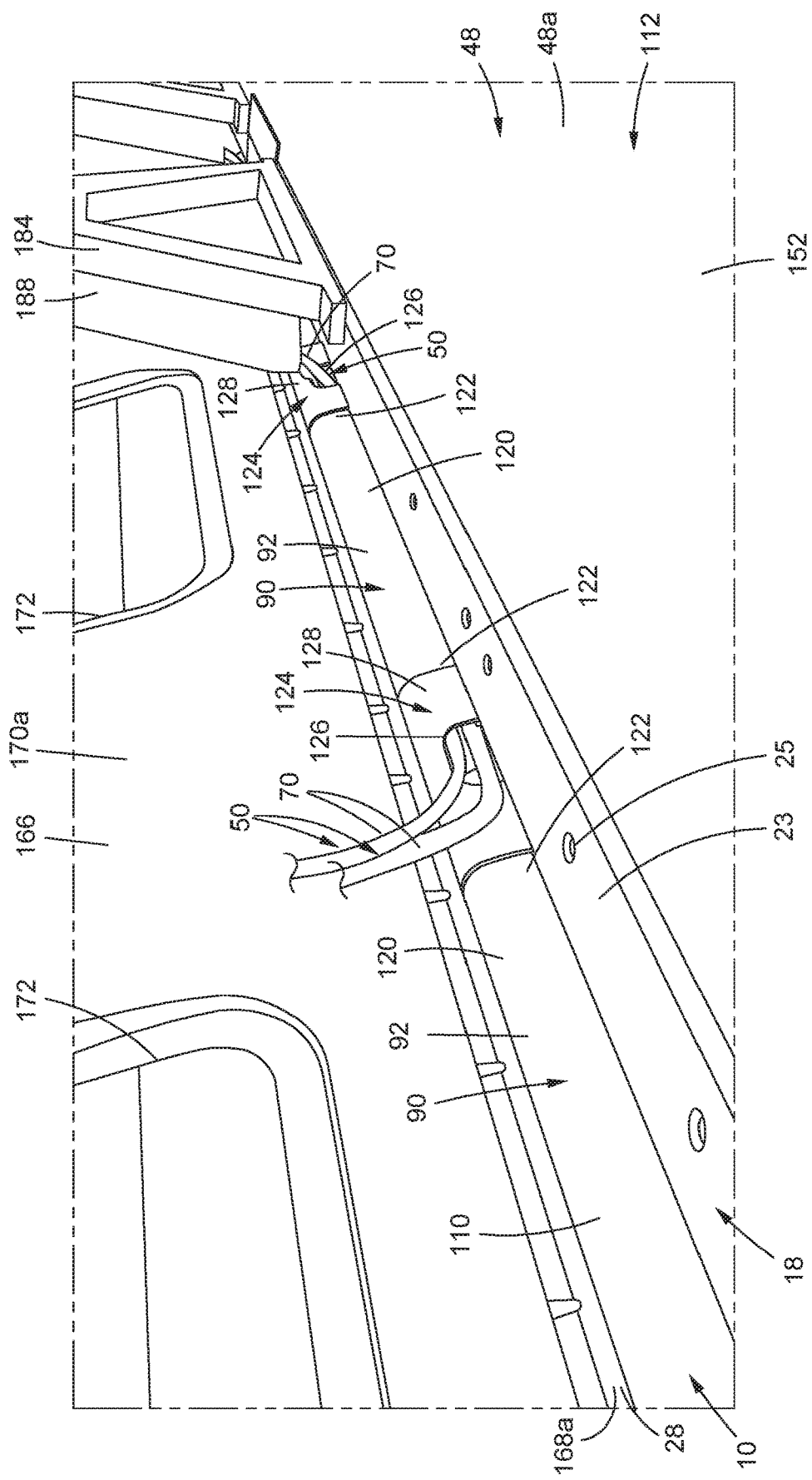
FIG. 10B is an illustration of an inboard side perspective close-up view of another version of a sidewall closeout area assembly of the disclosure showing breakout covers between raceway cover sections.

Now referring to FIG. 10B, FIG. 10B is an illustration of an inboard side perspective close-up view of a version of a sidewall closeout area assembly 10 of the disclosure including breakout covers 124, such as in the form of snap-in breakout covers 128, each having a breakout cover opening 126, positioned and aligned between end portions 122 of the raceway cover sections 120 of the raceway covers 90, such as snap-in raceway covers 92. As shown in FIG. 10B, the breakout cover openings 126 provide access to, and routing for, the plurality of conductive elements 50, such as in the form of the plurality of electrical runs 70, from the closeout area 142 (see FIGS. 1A, 4) of the sidewall closeout area assembly 10 to the interior 112 of the cabin 48, such as the passenger cabin 48a. In this version, the raceway cover 90 comprises two or more raceway cover sections 120, and one or more breakout covers 124, where each breakout cover 124 is positioned between, and aligned with, two raceway cover sections 120, in the longitudinal fore-aft direction 56 (see FIG. 1A), with one end portion 122 of each raceway cover section 120 adjacent to each end of the breakout cover 124. Both the raceway cover sections 120 and the breakout covers 124 are removably coupled, or snap fitted to the raceway 18, and between the bottom portion 28 of the sidewall assembly 26 (see FIGS. 1A, 3A), and in particular, the bottom end 168a of the air grille panel 166, and the aircraft floor structure 32, such as in the form of the longitudinal seat track 178, that runs along the floor 152 of the cabin 48. FIG. 10B further shows the second cover side 110 of each raceway cover 90 facing the interior 112 of the cabin 48. FIG. 10B further shows the raceway track portion 23 of the raceway 18, where the raceway track portion 23 has the plurality of openings 25 formed through, and along, the length of the raceway track portion 23. Each of the plurality of openings 25 may be configured to receive an attachment element 30 (see FIG. 1A), for attaching the raceway track portion 23 to an aircraft floor structure 32 (see FIG. 1B), such as a floor panel 180 (see FIG. 1B), or to the floor 152 (see FIG. 10A). FIG. 10B further shows the interior side 170a and the air grille openings 172 of the air grille panel 166, and the seat shroud 188 and the seat leg 184.

Figure 11:
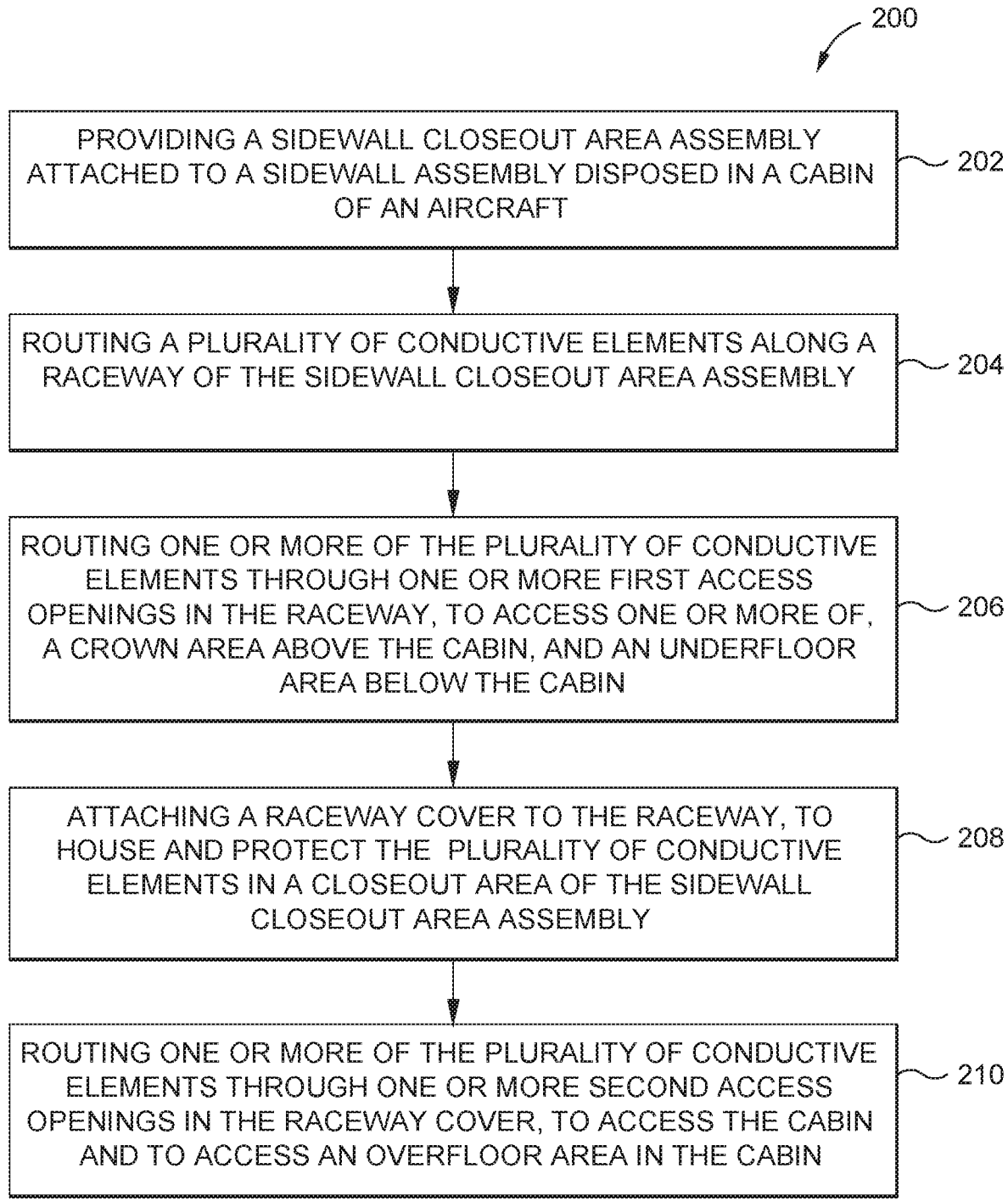
FIG. 11 is an illustration of a flow diagram of a version of a method of the disclosure.

Now referring to FIG. 11, FIG. 11 is an illustration of a flow diagram of a version of a method 200 of the disclosure. In another version of the disclosure, there is provided the method 200 of routing a plurality of conductive elements 50 (see FIG. 1A) through the sidewall closeout area assembly 10 (see FIG. 1A) in a cabin 48 (see FIG. 1B), such as a passenger cabin 48a (see FIG. 1B) of a vehicle 14 (see FIG. 1B), such as an aircraft 16 (see FIG. 1B).

The blocks in FIG. 11 represent operations and/or portions thereof, or elements, and lines connecting the various blocks do not imply any particular order or dependency of the operations or portions thereof, or elements. FIG. 11 and the disclosure of the steps of the method 200 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 11, the method 200 comprises the step of providing 202 the sidewall closeout area assembly 10 (see FIG. 1A) attached to a sidewall assembly 26 (see FIG. 1B) disposed in the cabin 48 of the aircraft 16. As discussed in detail above, the sidewall closeout area assembly 10 comprises the raceway 18 (see FIG. 1A) having the first end 20 (see FIG. 1A) attached to the bottom portion 28 (see FIG. 1B) of the sidewall assembly 27, the second end 22 (see FIG. 1A) attached to one or more aircraft floor structures 32 (see FIG. 1B), and the raceway body 24 (see FIG. 1A) formed between the first end 20 and the second end 22. The raceway body 24 has the first side 34 (see FIG. 1A) facing an interior frame 38 (see FIG. 1B) of the aircraft 16 and has the second side 36 (see FIG. 1A). The raceway body 24 comprises one or more first access openings 40 (see FIG. 1A) formed through the raceway body 24.

As further discussed above, the sidewall assembly 26 comprises one or more sidewall panels 160 (see FIG. 1B) coupled to one or more air grille panels 166 (see FIG. 1B), and the first end 20 of the raceway 18 is configured to attach, and attaches, to a bottom end 168a (see FIG. 1B) of each of the air grille panels 166 of the sidewall assembly 26. The second end 22 of the raceway 18 is configured to attach, and attaches, to the one or more aircraft floor structures 32 comprising one or more of, a fore-aft longitudinal floor grid structure 176, a longitudinal seat track 178, a floor panel 180, or another suitable aircraft floor structure.

As discussed above, the sidewall closeout area assembly 10 further comprises the raceway cover 90 (see FIG. 1A) removably coupled or attached to the raceway 18. The raceway cover 90 has the first cover side 108 (see FIG. 1A) configured to face, and facing, the second side 36 (see FIG. 1A) of the raceway body 24, when the raceway cover 90 is coupled or attached to the raceway 18. The raceway cover 90 has the second cover side 110 (see FIG. 1A) configured to face, and facing, an interior 112 (see FIG. 1B) of the cabin 48 (see FIG. 1B), when the raceway cover 90 is coupled or attached to the raceway 18 in the aircraft 16. The raceway cover 90 comprises one or more second access openings 114 (see FIG. 1A) formed through the raceway cover 90. As discussed above, the sidewall closeout area assembly 10 further comprises the closeout area 142 (see FIG. 1A) formed between the raceway body 24 and the raceway cover 90.

As shown in FIG. 11, the method 200 further comprises the step of routing 204 the plurality of conductive elements 50 (see FIG. 1A) along the raceway 18 of the sidewall closeout area assembly 10. The plurality of conductive elements 50 may be routed or installed in the sidewall closeout area assembly 10 before attaching the sidewall closeout area assembly 10 to the sidewall assembly 26 (see FIG. 1B), or the plurality of conductive elements 50 may be routed or installed in the sidewall closeout area assembly 10 after attaching the sidewall closeout area assembly 10 to the sidewall assembly 26.

The step of routing 204 the plurality of conductive elements 50 along the raceway 18 may further comprise, routing 204 the plurality of conductive elements 50 comprising one or more of, wires 60 (see FIG. 1A), cables 62 (see FIG. 1A) including electrical cables 62a (see FIG. 1A), data bus cables 62b (see FIG. 1A), high speed transmission cables 62c (see FIG. 1A), coaxial cables 62d (see FIG. 1A), and fiber optic cables 62e (see FIG. 1A), printed circuit boards (PCBs) 64 (see FIG. 1A), tubes 66 (see FIG. 1A), capacitors 68 (see FIG. 1A), or another suitable conductive element.

The step of routing 204 the plurality of conductive elements 50 along the raceway 18 may further comprise, routing 204 the plurality of conductive elements 50 comprising a plurality of electrical runs 70 (see FIG. 1A) comprising one or more of, power runs 72 (see FIG. 1A), data runs 74 (see FIG. 1A), lighting system runs 76 (see FIG. 1A), and seat system runs 78 (see FIG. 1A), including in-flight entertainment (IFE) system runs 80 (see FIG. 1A), seat actuation runs 82 (see FIG. 1A), and personal electronic device (PED) runs 84 (see FIG. 1A), or another suitable electrical run, and comprising one or more systems transport elements 85 (see FIG. 1A) comprising one or more of, pneumatic lines 85a (see FIG. 1A), air lines 85b (see FIG. 1A), fluid lines 85c (see FIG. 1A), water lines 85d (see FIG. 1A), or another suitable systems transport element.

As shown in FIG. 11, the method 200 further comprises the step of routing 206 one or more of the plurality of conductive elements 50 through the one or more first access openings 40 in the raceway 18, to access one or more of, a crown area 46 (see FIG. 1B) above the cabin 48, and an underfloor area 52 (see FIG. 1B) below the cabin 48. In another version, the raceway body 24 comprises two or more raceway body sections 54 (see FIG. 1A) aligned adjacent to each other, and the one or more first access openings 40 are formed between end portions 58 (see FIG. 1A) of adjacent raceway body sections 54a (see FIG. 1A).

As shown in FIG. 11, the method 200 further comprises the step of attaching 208 the raceway cover 90 to the raceway 18, to house and protect the plurality of conductive elements 50 in the closeout area 142 of the sidewall closeout area assembly 10. The step of attaching 208 the raceway cover 90 to the raceway 18 may further comprise, attaching 208 the raceway cover 90 comprising two or more raceway cover sections 120 (see FIG. 1A) aligned adjacent to each other, and the one or more second access openings 114 are formed between end portions 122 (see FIG. 1A) of adjacent raceway cover sections 120a (see FIG. 1A).

As shown in FIG. 11, the method 200 further comprises the step of routing 210 one or more of the plurality of conductive elements 50 through the one or more second access openings 114 in the raceway cover 90, to access the cabin 48 and to access an overfloor area 116 (see FIG. 1B) in the cabin 48. The step of routing 210 one or more of the plurality of conductive elements 50 through the one or more second access openings 114 may further comprise, routing 210 one or more of the plurality of conductive elements 50 through the one or more second access openings 114 comprising one or more breakout cover openings 126 (see FIG. 1A) formed in one or more breakout covers 124 (see FIG. 1A) positioned between two or more raceway cover sections 120 of the raceway cover 90. The one or more breakout covers 124 are removably coupled or attached to the raceway 18.

The sidewall closeout area assembly 10 facilitates accessibility to the plurality of conductive elements 50, and provides a routing path 86 (see FIG. 1A) for the plurality of conductive elements 50 that does not need to be reconfigured for different aircraft cabin layouts 87 (see FIG. 1A).

Figure 12:
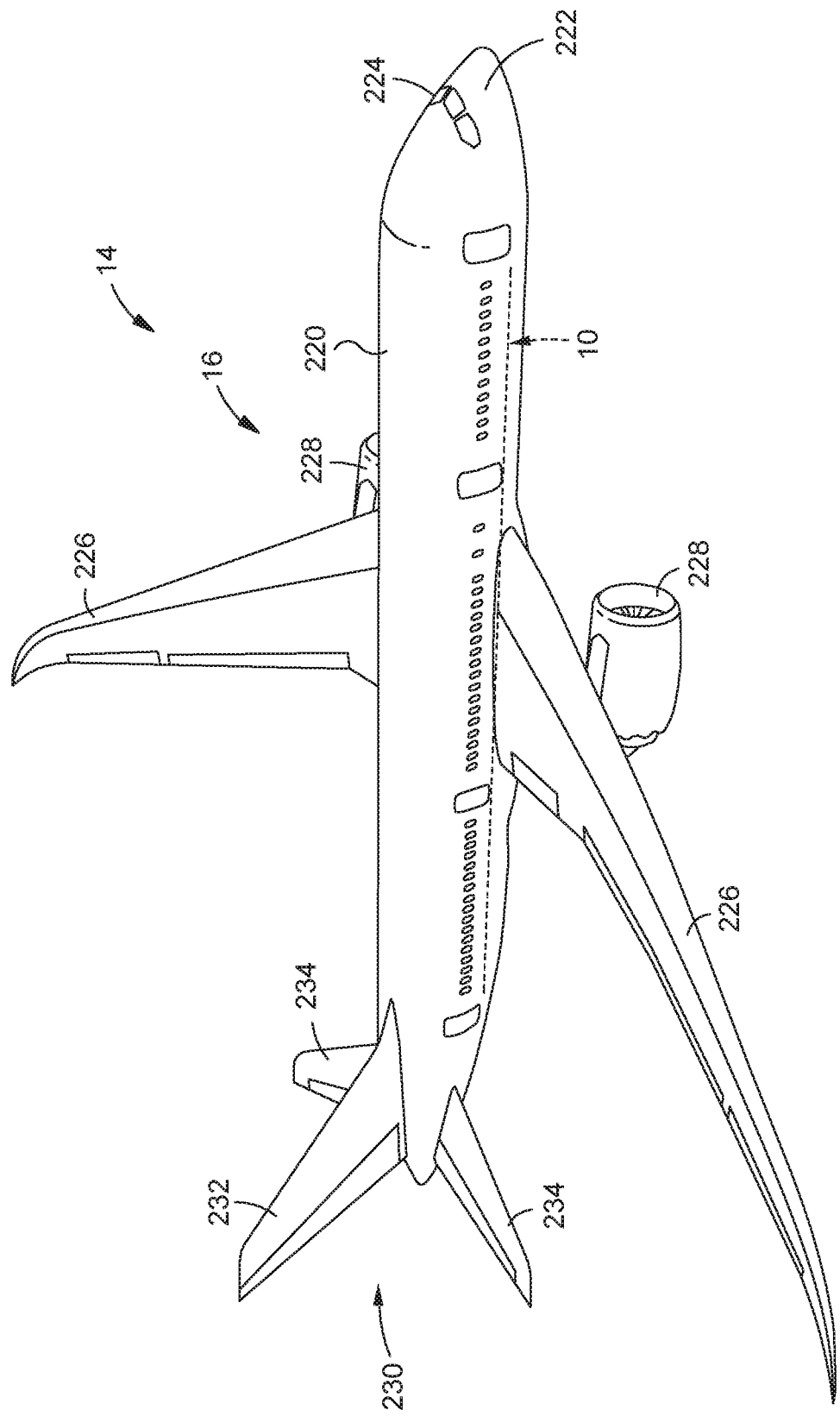
FIG. 12 is an illustration of a perspective view of an aircraft that incorporates a version of a closeout area assembly of the disclosure.

Now referring to FIG. 12, FIG. 12 is a diagrammatic representation of a perspective view of a vehicle 14, such as in the form of an aircraft 16, that incorporates a version of the sidewall closeout area assembly 10, of the disclosure. As further shown in FIG. 12, the vehicle 14, such as in the form of aircraft 16, comprises a fuselage 220, a nose 222, a cockpit 224, wings 226, engines 228, and an empennage 230 comprising a vertical stabilizer 232 and horizontal stabilizers 234. Although the vehicle 14, such as the aircraft 16, shown in FIG. 12 is generally representative of a commercial passenger aircraft having a version of the sidewall closeout area assembly 10, the teachings of the disclosed versions and examples may be applied to other air vehicles. For example, the teachings of the disclosed versions and examples may be applied to cargo aircraft, military aircraft, rotorcraft, and other types of aircraft or air vehicles. In addition, the teachings of the disclosed versions and examples may be applied to boats 17 (see FIG. 1B), trains 19 (see FIG. 1B), and other passenger carrying vehicles. In addition, the teachings of the disclosed versions and examples may be applied to structures where a highly reconfigurable conduit is required, for example, commercial and home conduit replacement, floor molding replacement, cubicle configuration, configuration of booths such as at trade shows, and other suitable structures.

Figure 13:
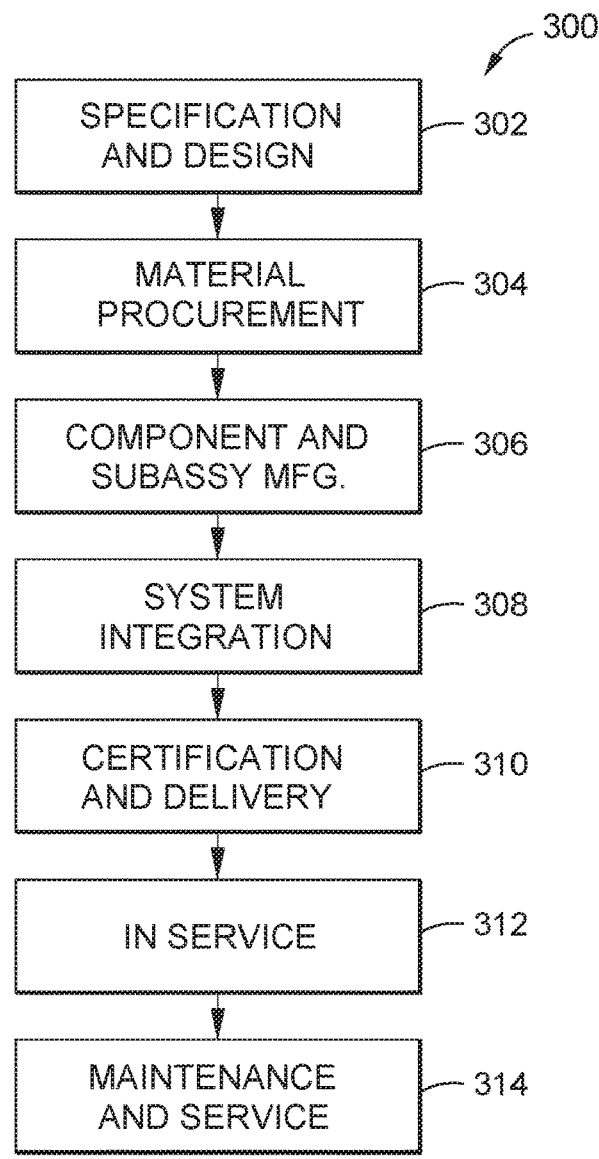
FIG. 13 is an illustration of a flow diagram of an exemplary aircraft manufacturing and service method.
Figure 14:
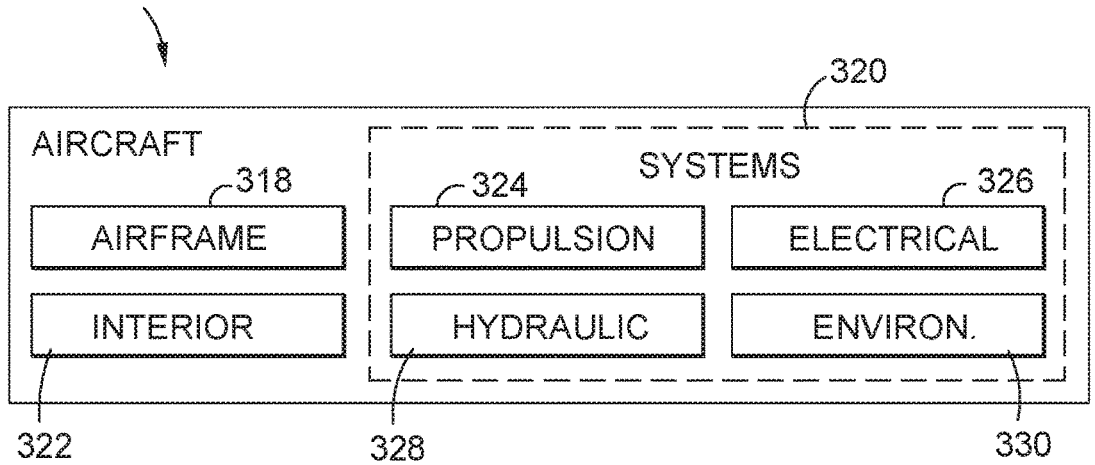
FIG. 14 is an illustration of an exemplary block diagram of an aircraft.

Now referring to FIGS. 13 and 14, FIG. 13 is an illustration of a flow diagram of an exemplary aircraft manufacturing and service method 300, and FIG. 14 is an illustration of an exemplary block diagram of an aircraft 316. Referring to FIGS. 13 and 14, versions of the disclosure may be described in the context of the aircraft manufacturing and service method 300 as shown in FIG. 13, and the aircraft 316 as shown in FIG. 14.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 14, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatuses, methods, or a combination thereof, may be utilized during component and subassembly manufacturing 306 and system integration 308, for example, by substantially expediting assembly of or reducing the cost of the aircraft 316. Similarly, one or more of apparatuses, methods, or a combination thereof, may be utilized while the aircraft 316 is in service 312, for example and without limitation, to maintenance and service 314.

Disclosed versions of the sidewall closeout area assembly 10 (see FIGS. 1A, 4, 6), the sidewall closeout area system 12

(see FIGS. 1B, 3A-3B), and the method 200 (see FIG. 11) provide a functional electrical conduit 156 (see FIG. 1A) through the length 158 (see FIG. 1B) of the cabin 48 (see FIG. 1B), such as the passenger cabin 48a (see FIG. 1B), capable of containing systems routing 88 (see FIG. 1A) for the plurality of conductive elements 50 (see FIG. 1A), such as the plurality of electrical runs 70 (see FIG. 1A), for example, power runs 72 (see FIG. 1A), data runs 74 (see FIG. 1A), lighting system runs 76 (see FIG. 1A), seat system runs 78 (see FIG. 1A), and other electrical runs. Disclosed versions of the sidewall closeout area assembly 10 (see FIGS. 1A, 4, 6), the sidewall closeout area system 12 (see FIGS. 1B, 3A-3B), and the method 200 (see FIG. 11) have the capability to provide intermittent routing breakouts 139 (see FIG. 1A) to one or more of, above the cabin 48 (see FIG. 1B), such as the crown area 46 (see FIG. 1B), and/or below the floor 152 (see FIG. 1B) of the cabin 48, such as the underfloor area 52 (see FIG. 1B), and with access provided from within the interior 112 (see FIG. 1B) of the cabin 48 of the vehicle 14 (see FIG. 1B), such as the aircraft 16 (see FIG. 1B). In addition, the sidewall closeout area assembly 10 (see FIGS. 1A-1B) has the advantage of improving a bend radius 194 (see FIG. 1B) of the plurality of conductive elements 50 (see FIG. 1B), for example, wires 60 (see FIG. 1A) and cables 62 (see FIG. 1A), by allowing the wires 60 and cables 62 to bend, or turn, more easily out of the first access openings 40 (see FIG. 1A) and out of the second access openings 114 (see FIG. 1A), including the breakout cover openings 126 (see FIG. 1A), to the crown area 46 (see FIG. 1B), to the underfloor area 52 (see FIG. 1B), to the interior 112 (see FIG. 1B) of the cabin 48 (see FIG. 1B), to the overfloor area 116 (see FIG. 1B), to the seat shroud 188 (see FIG. 1B), and/or to the seat legs 184 (see FIG. 1B). The functional electrical conduit 156 is coupled, or attached, to the sidewall assembly 26 (see FIG. 1B), and in particular, to the bottom end 168a (see FIG. 1B) of the air grille panel 166 (see FIG. 1B), to allow for the seat-to-seat wires 60 and cables 62 and other systems routing 88 (see FIG. 1A) to be routed. In addition, with the sidewall closeout area assembly 10, the air grilles 174 (see FIG. 1B) may be moved inboard to eliminate step loads. Further, disclosed versions of the sidewall closeout area assembly 10 (see FIGS. 1A, 4, 6A), the sidewall closeout area system 12 (see FIGS. 1B, 3A-3B), and the method 200 (see FIG. 11) allow for pre-installation of the plurality of electrical runs 70 (see FIG. 1B), such as wires 60 and cables 62 on a work bench, as the sidewall assemblies 26 may be installed in sections. The envelope of the closeout area 142, or channel, is preferably optimized to allow for environmental control system (ECS) constraints, such as air flow, decompression, and the like.

Moreover, disclosed versions of the sidewall closeout area assembly 10 (see FIGS. 1A, 4, 6A), the sidewall closeout area system 12 (see FIGS. 1B, 3A-3B), and the method 200 (see FIG. 11) provide a stable routing path 86 (see FIG. 1B) that does not need to be re-engineered for different aircraft cabin layouts 87 (see FIG. 1B), and provide a modular design 146 (see FIG. 1A) that is configurable and applicable to all possible variation of aircraft layouts. The closeout area 142 (see FIG. 1A), or routing area, in the sidewall closeout area assembly 10 provides a space where the plurality of conductive elements 50 (see FIG. 1A), for example, wires 60 (see FIG. 1A) and cables 62 (see FIG. 1A), will not be damaged by contact from passengers or carry-on freight in the interior 112 (see FIG. 1B) of the cabin 48 (see FIG. 1B) of the aircraft 16 (see FIG. 1B). The closeout area 142 (see FIG. 1A) between the raceway 18 (see FIG. 1A) and the raceway cover 90 (see FIG. 1A) has a cross-sectional area 144 (see FIG. 1A) that is sufficiently large enough to house and protect the plurality of conductive elements 50, and that is sufficiently small enough to provide adequate support. Further, disclosed versions of the sidewall closeout area assembly 10 (see FIGS. 1A, 4, 6A), the sidewall closeout area system 12 (see FIGS. 1B, 3A-3B), and the method 200 (see FIG. 11) provide an architecture that is easy to install and minimizes or avoids ergonomic issues for installers.

In addition, disclosed versions of the sidewall closeout area assembly 10 (see FIGS. 1A, 4, 6A), the sidewall closeout area system 12 (see FIGS. 1B, 3A-3B), and the method 200 (see FIG. 11) provide a closeout area 142 (see FIG. 1A), such as a channel or space, in an otherwise unused volume 148 (see FIG. 1A) of the aircraft 16 (see FIG. 1B), and eliminate the need for congestion of wires 60, cables 62, and other conductive elements 50, above the floor 152 (see FIG. 1B) in the cabin 48 (see FIG. 1B). Disclosed versions of the sidewall closeout area assembly 10 (see FIGS. 1A, 4, 6A), the sidewall closeout area system 12 (see FIGS. 1B, 3A-3B), and the method 200 (see FIG. 11) improve the visual appearance of the cabin 48 by eliminating traversing electrical runs and known floor covering solutions that may cause protrusions in the cabin 48. The aesthetic benefit of eliminating variability in the floor covering and protrusions in the cabin 48 is one of the many advantages disclosed versions of the sidewall closeout area assembly 10 (see FIGS. 1A, 4, 6A), the sidewall closeout area system 12 (see FIGS. 1B, 3A-3B), and the method 200 (see FIG. 11) provide over known assemblies, systems, and methods.

Moreover, disclosed versions of the sidewall closeout area assembly 10 (see FIGS. 1A, 4, 6A), the sidewall closeout area system 12 (see FIGS. 1B, 3A-3B), and the method 200 (see FIG. 11) provide floor penetration elimination 150 (see FIG. 1A) and remove the need to penetrate the floor 152 of the cabin 48 with holes 151 (see FIG. 2B) to route the plurality of conductive elements 50 between main runs located below the floor 152 in the underfloor area 52 (see FIG. 1B), in the cabin 48 (see FIG. 1B), and optionally in the crown area 46 (see FIG. 1B), by locating the plurality of conductive elements 50, for example, wires 60, cables 62, or other conductive elements, such that they can be accessible and easily routed without interference through aircraft structures. Further, disclosed versions of the sidewall closeout area assembly 10 (see FIGS. 1A, 4, 6A), the sidewall closeout area system 12 (see FIGS. 1B, 3A-3B), and the method 200 (see FIG. 11) integrate the sidewall assembly 26 and systems routing 88 in the cabin 48 to reduce cost and weight, eliminate variability in design and installation, and take advantage of the unused volume 148 (see FIG. 1A) in the aircraft 16 (see FIG. 1B). Thus, disclosed versions of the sidewall closeout area assembly 10 (see FIGS. 1A, 4, 6A), the sidewall closeout area system 12 (see FIGS. 1B, 3A-3B), and the method 200 (see FIG. 11) provide one simple, easy to access, volume in the cabin 48 of the aircraft 16. In particular, disclosed versions of the sidewall closeout area assembly 10 (see FIGS. 1A, 4, 6A), the sidewall closeout area system 12 (see FIGS. 1B, 3A-3B), and the method 200 (see FIG. 11) integrate and provide the functionality of an air path channel, a moisture control feature, a floor panel, and a raceway or channel, thus providing a single sidewall closeout area assembly 10 with the functionality of four (4) independent parts.

In addition, disclosed versions of the sidewall closeout area assembly 10 (see FIGS. 1A, 4, 6A), the sidewall closeout area system 12 (see FIGS. 1B, 3A-3B), and the method 200 (see FIG. 11) provide for rapid reconfiguration of seats 182, such as palletized seats 182a, at different seat pitches, in the cabin 48, such as the passenger cabin 48a, of the aircraft 16.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. A sidewall closeout area assembly for an aircraft, the sidewall closeout area assembly comprising:
    a raceway having a first end, a second end, and a raceway body formed between the first end and the second end, wherein:
        the first end of the raceway is configured to attach to a bottom portion of a sidewall assembly configured for installation in a cabin of the aircraft;
        the second end of the raceway is configured to attach to one or more aircraft floor structures; and
        the raceway body has a first side configured to face an interior frame of the aircraft, and the raceway body comprises one or more first access openings providing access to one or more of, a crown area and an underfloor area, in the aircraft, for a plurality of conductive elements routed along the raceway;
    a raceway cover removably coupled to the raceway, the raceway cover having a first cover side facing a second side of the raceway body, and having a second cover side configured to face an interior of the cabin, the raceway cover comprising one or more second access openings providing access to the cabin and access to an overfloor area in the cabin for the plurality of conductive elements routed along the raceway; and
    a closeout area formed between the raceway body and the raceway cover, the closeout area configured to house and protect the plurality of conductive elements routed along the raceway,
    wherein the sidewall closeout area assembly facilitates accessibility to the plurality of conductive elements, and provides a routing path for the plurality of conductive elements that does not need to be reconfigured for different aircraft cabin layouts.

2. The sidewall closeout area assembly of claim 1, wherein the sidewall assembly comprises one or more sidewall panels coupled to one or more air grille panels, and the first end of the raceway is configured to attach to a bottom end of each of the air grille panels of the sidewall assembly.

3. The sidewall closeout area assembly of claim 1, wherein the second end of the raceway is configured to attach to the one or more aircraft floor structures comprising one or more of, a fore-aft longitudinal floor grid structure, a longitudinal seat track, and a floor panel.

4. The sidewall closeout area assembly of claim 1, wherein the raceway body comprises two or more raceway body sections aligned adjacent to each other, and the one or more first access openings are formed between end portions of adjacent raceway body sections.

5. The sidewall closeout area assembly of claim 1, wherein the plurality of conductive elements comprise one or more of, wires, cables including electrical cables, data bus cables, high speed transmission cables, coaxial cables, and fiber optic cables, printed circuit boards (PCBs), tubes, and capacitors.

6. The sidewall closeout area assembly of claim 1, wherein the plurality of conductive elements comprise a plurality of electrical runs comprising one or more of, power runs, data runs, lighting system runs, and seat system runs, including in-flight entertainment (IFE) system runs, seat actuation runs, and personal electronic device (PED) runs, and comprise one or more systems transport elements comprising one or more of, pneumatic lines, air lines, fluid lines, and water lines.

7. The sidewall closeout area assembly of claim 1, wherein the raceway cover comprises two or more raceway cover sections aligned adjacent to each other, and the one or more second access openings are formed between end portions of adjacent raceway cover sections.

8. The sidewall closeout area assembly of claim 1, wherein the raceway cover comprises two or more raceway cover sections, and wherein the sidewall closeout area assembly further comprises one or more breakout covers positioned between the two or more raceway cover sections and removably coupled to the raceway, and the one or more second access openings comprise one or more breakout cover openings formed in the one or more breakout covers.

9. The sidewall closeout area assembly of claim 1, wherein the raceway cover comprises a snap-in raceway cover.

10. A sidewall closeout area system for an aircraft, the sidewall closeout area system comprising:
    a sidewall assembly disposed in a cabin of the aircraft;
    a sidewall closeout area assembly attached to the sidewall assembly, the sidewall closeout area assembly comprising:
        a raceway having a first end attached to a bottom portion of the sidewall assembly, a second end attached to one or more aircraft floor structures, and a raceway body formed between the first end and the second end, the raceway body having a first side facing an interior frame of the aircraft, and the raceway body comprising one or more first access openings providing access to one or more of, a crown area and an underfloor area, in the aircraft, for a plurality of conductive elements routed along the raceway;
        a raceway cover removably coupled to the raceway, the raceway cover having a first cover side facing a second side of the raceway body, and having a second cover side facing an interior of the cabin, the raceway cover comprising one or more second access openings providing access to the cabin and access to an overfloor area in the cabin for the plurality of conductive elements routed along the raceway; and
        a closeout area formed between the raceway body and the raceway cover, the closeout area housing and protecting the plurality of conductive elements routed along the raceway,
    wherein the sidewall closeout area system facilitates accessibility to the plurality of conductive elements, and provides a routing path for the plurality of conductive elements that does not need to be reconfigured for different aircraft cabin layouts.

11. The sidewall closeout area system claim 10, wherein the sidewall assembly comprises one or more sidewall panels coupled to one or more air grille panels, and the first end of the raceway is attached to a bottom end of each of the air grille panels of the sidewall assembly.

12. The sidewall closeout area system of claim 10, wherein the second end of the raceway of the sidewall closeout area assembly is attached to the one or more aircraft floor structures comprising one or more of, a fore-aft longitudinal floor grid structure, a longitudinal seat track, and a floor panel.

13. The sidewall closeout area system of claim 10, wherein the plurality of conductive elements comprise one or more of, wires, cables including electrical cables, data bus cables, high speed transmission cables, coaxial cables, and fiber optic cables, printed circuit boards (PCBs), tubes, and capacitors.

14. The sidewall closeout area system of claim 10, wherein the plurality of conductive elements comprise a plurality of electrical runs comprising one or more of, power runs, data runs, lighting system runs, and seat system runs, including in-flight entertainment (IFE) system runs, seat actuation runs, and personal electronic device (PED) runs, and comprise one or more systems transport elements comprising one or more of, pneumatic lines, air lines, fluid lines, and water lines.

15. The sidewall closeout area system of claim 10, wherein the raceway cover of the sidewall closeout area assembly comprises two or more raceway cover sections, and wherein the sidewall closeout area assembly further comprises one or more breakout covers positioned between the two or more raceway cover sections and removably coupled to the raceway, and the one or more second access openings comprise one or more breakout cover openings formed in the one or more breakout covers.

16. A method of routing a plurality of conductive elements through a sidewall closeout area assembly in an aircraft, the method comprising the steps of:
   providing the sidewall closeout area assembly attached to a sidewall assembly disposed in a cabin of the aircraft, the sidewall closeout area assembly comprising:
      a raceway having a first end attached to a bottom portion of the sidewall assembly, a second end attached to one or more aircraft floor structures, and a raceway body formed between the first end and the second end, the raceway body having a first side facing an interior frame of the aircraft, and the raceway body comprising one or more first access openings;
      a raceway cover removably coupled to the raceway, the raceway cover having a first cover side configured to face a second side of the raceway body, and having a second cover side configured to face an interior of the cabin, the raceway cover comprising one or more second access openings; and
      a closeout area formed between the raceway body and the raceway cover;
   routing the plurality of conductive elements along the raceway of the sidewall closeout area assembly;
   routing one or more of the plurality of conductive elements through the one or more first access openings in the raceway, to access one or more of, a crown area above the cabin, and an underfloor area below the cabin;
   attaching the raceway cover to the raceway, to house and protect the plurality of conductive elements in the closeout area of the sidewall closeout area assembly; and
   routing one or more of the plurality of conductive elements through the one or more second access openings in the raceway cover, to access the cabin and to access an overfloor area in the cabin,
   wherein the sidewall closeout area assembly facilitates accessibility to the plurality of conductive elements, and provides a routing path for the plurality of conductive elements that does not need to be reconfigured for different aircraft cabin layouts.

17. The method of claim 16, wherein routing the plurality of conductive elements along the raceway further comprises, routing the plurality of conductive elements comprising one or more of, wires, cables including electrical cables, data bus cables, high speed transmission cables, coaxial cables, and fiber optic cables, printed circuit boards (PCBs), tubes, and capacitors.

18. The method of claim 16, wherein routing the plurality of conductive elements along the raceway further comprises, routing the plurality of conductive elements comprise a plurality of electrical runs comprising one or more of, power runs, data runs, lighting system runs, and seat system runs, including in-flight entertainment (IFE) system runs, seat actuation runs, and personal electronic device (PED) runs, and comprise one or more systems transport elements comprising one or more of, pneumatic lines, air lines, fluid lines, and water lines.

19. The method of claim 16, wherein attaching the raceway cover to the raceway further comprises, attaching the raceway cover comprising two or more raceway cover sections aligned adjacent to each other, and the one or more second access openings are formed between end portions of adjacent raceway cover sections.

20. The method of claim 16, wherein routing one or more of the plurality of conductive elements through the one or more second access openings further comprises, routing one or more of the plurality of conductive elements through the one or more second access openings comprising one or more breakout cover openings formed in one or more breakout covers positioned between two or more raceway cover sections of the raceway cover, the one or more breakout covers removably coupled to the raceway.

* * * * *